(12) United States Patent
Dagon et al.

(10) Patent No.: US 10,044,748 B2
(45) Date of Patent: *Aug. 7, 2018

(54) METHODS AND SYSTEMS FOR DETECTING COMPROMISED COMPUTERS

(71) Applicant: GEORGIA TECH RESEARCH CORPORATION, Atlanta, GA (US)

(72) Inventors: David Dagon, Tampa, FL (US); Nick Feamster, Atlanta, GA (US); Wenke Lee, Atlanta, GA (US); Robert Edmonds, Woodstock, GA (US); Richard Lipton, Atlanta, GA (US); Anirudh Ramachandran, Atlanta, GA (US)

(73) Assignees: Georgia Tech Research Corporation, Atlanta, GA (US); Georgia Institute of Technology, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,272

(22) Filed: Feb. 9, 2016

(65) Prior Publication Data
US 2016/0156660 A1 Jun. 2, 2016

Related U.S. Application Data

(63) Continuation of application No. 14/015,661, filed on Aug. 30, 2013, now Pat. No. 9,306,969, which is a
(Continued)

(51) Int. Cl.
*H04L 29/06* (2006.01)
*H04L 29/12* (2006.01)

(52) U.S. Cl.
CPC .... *H04L 63/1441* (2013.01); *H04L 29/12066* (2013.01); *H04L 61/1511* (2013.01);
(Continued)

(58) Field of Classification Search
USPC ..................................................... 726/22, 23
See application file for complete search history.

(56) References Cited

U.S. PATENT DOCUMENTS

| 4,843,540 A | 6/1989 | Stolfo |
| 4,860,201 A | 8/1989 | Stolfo et al. |

(Continued)

FOREIGN PATENT DOCUMENTS

| WO | WO 02/37730 | 5/2002 |
| WO | WO 02/098100 | 12/2002 |
| WO | WO 2007/050244 | 5/2007 |

OTHER PUBLICATIONS

Whyte et al "DNS-Based Detection of Scannin Works in an Enterprise Network," Proceedings of the 12th Annual Network and Distributed System Security Symposium, Feb. 2005. 15 pages.*
(Continued)

*Primary Examiner* — Jason T Lee
(74) *Attorney, Agent, or Firm* — Pepper Hamilton LLP

(57) ABSTRACT

A system and method for detecting a first network of compromised computers in a second network of computers, comprising: collecting Domain Name System (DNS) data for the second network; examining the collected data relative to DNS data from known comprised and/or uncompromised computers in the second network; and determining the existence of the first network and/or the identity of compromised computers in the second network based on the examination.

19 Claims, 28 Drawing Sheets

Related U.S. Application Data continuation of application No. 11/538,212, filed on Oct. 3, 2006, now Pat. No. 8,566,928.

(60) Provisional application No. 60/730,615, filed on Oct. 27, 2005, provisional application No. 60/799,248, filed on May 10, 2006.

(52) U.S. Cl.
CPC ...... *H04L 63/1425* (2013.01); *H04L 63/1491* (2013.01); *H04L 29/12301* (2013.01); *H04L 61/2076* (2013.01); *H04L 2463/144* (2013.01)

(56) References Cited

U.S. PATENT DOCUMENTS

| | | | |
|---|---|---|---|
| 5,363,473 | A | 11/1994 | Stolfo et al. |
| 5,497,486 | A | 3/1996 | Stolfo et al. |
| 5,563,783 | A | 10/1996 | Stolfo et al. |
| 5,668,897 | A | 9/1997 | Stolfo |
| 5,717,915 | A | 2/1998 | Stolfo et al. |
| 5,748,780 | A | 5/1998 | Stolfo |
| 5,920,848 | A | 7/1999 | Schultzer et al. |
| 6,401,118 | B1 | 6/2002 | Thomas |
| 6,738,908 | B1 | 5/2004 | Bonn et al. |
| 6,983,320 | B1 | 1/2006 | Thomas et al. |
| 7,013,323 | B1 | 3/2006 | Thomas et al. |
| 7,039,721 | B1 | 5/2006 | Wu et al. |
| 7,043,759 | B2 | 5/2006 | Kaaschoek et al. |
| 7,069,249 | B2 | 6/2006 | Stolfo et al. |
| 7,093,292 | B1 | 8/2006 | Pantuso |
| 7,136,932 | B1 | 11/2006 | Schneider |
| 7,152,242 | B2 | 12/2006 | Douglas |
| 7,162,741 | B2 | 1/2007 | Eskin et al. |
| 7,185,368 | B2 | 2/2007 | Copeland, III |
| 7,203,959 | B2 | 4/2007 | Nachenberg et al. |
| 7,225,343 | B1 | 5/2007 | Honig et al. |
| 7,277,961 | B1 | 10/2007 | Smith et al. |
| 7,278,163 | B2 | 10/2007 | Banzhof |
| 7,290,283 | B2 | 10/2007 | Copeland, III |
| 7,331,060 | B1 | 2/2008 | Ricciulli |
| 7,372,809 | B2 | 5/2008 | Chen et al. |
| 7,383,577 | B2 * | 6/2008 | Hrastar ............... H04L 63/1416 380/255 |
| 7,424,619 | B1 | 9/2008 | Fan et al. |
| 7,426,576 | B1 | 9/2008 | Banga et al. |
| 7,448,084 | B1 | 11/2008 | Apap et al. |
| 7,475,426 | B2 | 1/2009 | Copeland, III |
| 7,483,947 | B2 | 1/2009 | Starbuck |
| 7,487,544 | B2 | 2/2009 | Schultz et al. |
| 7,512,980 | B2 | 3/2009 | Copeland et al. |
| 7,519,818 | B2 | 4/2009 | Levin et al. |
| 7,519,994 | B2 | 4/2009 | Judge et al. |
| 7,536,360 | B2 | 5/2009 | Stolfo et al. |
| 7,549,169 | B1 * | 6/2009 | Sobel ............... G06F 21/56 709/221 |
| 7,634,808 | B1 * | 12/2009 | Szor ............... H04L 63/1425 709/223 |
| 7,639,714 | B2 | 12/2009 | Stolfo et al. |
| 7,644,150 | B1 | 1/2010 | Nucci et al. |
| 7,644,151 | B1 | 1/2010 | Jerrim et al. |
| 7,657,935 | B2 | 2/2010 | Stolfo et al. |
| 7,665,131 | B2 | 2/2010 | Goodman |
| 7,698,442 | B1 | 4/2010 | Krishnamurthy |
| 7,712,132 | B1 | 5/2010 | Ogilvie |
| 7,712,134 | B1 | 5/2010 | Nucci et al. |
| 7,752,125 | B1 | 7/2010 | Kothari et al. |
| 7,752,665 | B1 | 7/2010 | Robertson et al. |
| 7,779,463 | B2 | 8/2010 | Stolfo et al. |
| 7,784,097 | B1 | 8/2010 | Stolfo et al. |
| 7,809,670 | B2 | 10/2010 | Lee et al. |
| 7,818,797 | B1 | 10/2010 | Fan et al. |
| 7,882,542 | B2 | 2/2011 | Neystadt |
| 7,886,358 | B2 | 2/2011 | Copeland, III |
| 7,890,627 | B1 | 2/2011 | Thomas |
| 7,895,326 | B2 | 2/2011 | Jerrim et al. |
| 7,913,306 | B2 | 3/2011 | Apap et al. |
| 7,930,353 | B2 | 4/2011 | Chickering |
| 7,962,798 | B2 | 6/2011 | Locasto et al. |
| 7,979,907 | B2 | 7/2011 | Schultz et al. |
| 7,996,288 | B1 | 8/2011 | Stolfo |
| 8,015,414 | B2 | 9/2011 | Mahone |
| 8,019,764 | B1 | 9/2011 | Nucci |
| 8,065,722 | B2 | 11/2011 | Barford et al. |
| 8,074,115 | B2 | 12/2011 | Stolfo et al. |
| 8,161,130 | B2 | 4/2012 | Stokes |
| 8,170,966 | B1 | 5/2012 | Musat et al. |
| 8,180,916 | B1 | 5/2012 | Nucci et al. |
| 8,200,761 | B1 | 6/2012 | Tevanian |
| 8,224,994 | B1 | 7/2012 | Schneider |
| 8,260,914 | B1 | 9/2012 | Ranjan |
| 8,341,745 | B1 | 12/2012 | Chau |
| 8,347,394 | B1 | 1/2013 | Lee |
| 8,402,543 | B1 | 3/2013 | Ranjan et al. |
| 8,418,249 | B1 | 4/2013 | Nucci et al. |
| 8,484,377 | B1 | 7/2013 | Chen et al. |
| 8,516,585 | B2 | 8/2013 | Cao et al. |
| 8,527,592 | B2 | 9/2013 | Gabe |
| 8,578,497 | B2 | 11/2013 | Antonakakis et al. |
| 8,631,489 | B2 | 1/2014 | Antonakakis et al. |
| 8,667,583 | B2 | 3/2014 | Polyakov et al. |
| 8,826,438 | B2 | 9/2014 | Perdisci et al. |
| 8,832,829 | B2 | 9/2014 | Manni et al. |
| 8,869,269 | B1 | 10/2014 | Ramzan et al. |
| 9,306,969 | B2 | 4/2016 | Dagon et al. |
| 9,516,058 | B2 | 12/2016 | Antonakakis et al. |
| 9,525,699 | B2 | 12/2016 | Antonakakis et al. |
| 2001/0014093 | A1 | 8/2001 | Yoda et al. |
| 2001/0044785 | A1 | 11/2001 | Stolfo et al. |
| 2001/0052007 | A1 | 12/2001 | Shigezumi |
| 2001/0052016 | A1 | 12/2001 | Skene et al. |
| 2001/0055299 | A1 | 12/2001 | Kelly |
| 2002/0021703 | A1 | 2/2002 | Tsuchiya et al. |
| 2002/0066034 | A1 * | 5/2002 | Schlossberg ......... G06F 21/552 726/23 |
| 2002/0166063 | A1 | 11/2002 | Lachman et al. |
| 2002/0178238 | A1 | 11/2002 | Fletcher et al. |
| 2003/0065926 | A1 | 4/2003 | Schultz et al. |
| 2003/0065943 | A1 | 4/2003 | Geis et al. |
| 2003/0069992 | A1 | 4/2003 | Ramig |
| 2003/0145233 | A1 | 7/2003 | Poletto et al. |
| 2003/0167308 | A1 | 9/2003 | Schran |
| 2003/0167402 | A1 | 9/2003 | Stolfo et al. |
| 2003/0204621 | A1 | 10/2003 | Poletto et al. |
| 2003/0236995 | A1 | 12/2003 | Fretwell, Jr. |
| 2004/0002903 | A1 | 1/2004 | Stolfo et al. |
| 2004/0039798 | A1 | 2/2004 | Hotz et al. |
| 2004/0044791 | A1 | 3/2004 | Pouzzner |
| 2004/0088346 | A1 | 5/2004 | Hassler et al. |
| 2004/0088348 | A1 | 5/2004 | Yeager |
| 2004/0111636 | A1 | 6/2004 | Baffes et al. |
| 2004/0181687 | A1 | 9/2004 | Nachenberg et al. |
| 2004/0187032 | A1 | 9/2004 | Gels et al. |
| 2004/0205474 | A1 | 10/2004 | Eskin et al. |
| 2004/0215972 | A1 | 10/2004 | Sung et al. |
| 2005/0021848 | A1 * | 1/2005 | Jorgenson ............ G06F 9/505 709/238 |
| 2005/0036501 | A1 | 2/2005 | Chung et al. |
| 2005/0039019 | A1 | 2/2005 | Delany |
| 2005/0044406 | A1 | 2/2005 | Stute |
| 2005/0050377 | A1 | 3/2005 | Chan et al. |
| 2005/0060643 | A1 | 3/2005 | Glass et al. |
| 2005/0086523 | A1 | 4/2005 | Zimmer et al. |
| 2005/0108407 | A1 | 5/2005 | Johnson et al. |
| 2005/0108415 | A1 | 5/2005 | Turk et al. |
| 2005/0210534 | A1 | 9/2005 | Krishnamurthy |
| 2005/0257264 | A1 | 11/2005 | Stolfo et al. |
| 2005/0261943 | A1 | 11/2005 | Quarterman et al. |
| 2005/0265331 | A1 | 12/2005 | Stolfo |
| 2005/0278540 | A1 | 12/2005 | Cho |
| 2005/0281291 | A1 | 12/2005 | Stolfo et al. |
| 2006/0015630 | A1 | 1/2006 | Stolfo et al. |
| 2006/0015722 | A1 | 1/2006 | Rowan et al. |
| 2006/0026682 | A1 | 2/2006 | Zakas |

(56) References Cited

U.S. PATENT DOCUMENTS

| | | |
|---|---|---|
| 2006/0031483 A1 | 2/2006 | Lund |
| 2006/0067240 A1 | 3/2006 | Kim et al. |
| 2006/0068806 A1 | 3/2006 | Nam |
| 2006/0075084 A1 | 4/2006 | Lyon |
| 2006/0075494 A1 | 4/2006 | Bertman et al. |
| 2006/0078096 A1* | 4/2006 | Poyhonen ......... H04L 29/06027 379/88.12 |
| 2006/0143711 A1* | 6/2006 | Huang ................ H04L 63/1416 726/23 |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0174345 A1 | 8/2006 | Flanagan et al. |
| 2006/0176822 A1* | 8/2006 | Doyle ................ H04L 12/2697 370/241 |
| 2006/0178994 A1 | 8/2006 | Stolfo et al. |
| 2006/0200539 A1 | 9/2006 | Kappler et al. |
| 2006/0212925 A1 | 9/2006 | Shull |
| 2006/0212942 A1 | 9/2006 | Barford et al. |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon |
| 2006/0253584 A1 | 11/2006 | Dixon |
| 2006/0259967 A1 | 11/2006 | Thomas et al. |
| 2006/0265436 A1 | 11/2006 | Edmond |
| 2006/0288415 A1 | 12/2006 | Wong |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1 | 5/2007 | Rand et al. |
| 2007/0136455 A1 | 6/2007 | Lee et al. |
| 2007/0162587 A1 | 7/2007 | Lund et al. |
| 2007/0198679 A1 | 8/2007 | Duyanovich et al. |
| 2007/0209074 A1 | 9/2007 | Coffman |
| 2007/0239999 A1 | 10/2007 | Honig et al. |
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1 | 1/2008 | Capalik |
| 2008/0028073 A1 | 1/2008 | Trabe et al. |
| 2008/0028463 A1 | 1/2008 | Dagon |
| 2008/0060054 A1 | 3/2008 | Srivastava |
| 2008/0060071 A1 | 3/2008 | Hennan |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch et al. |
| 2008/0195369 A1 | 8/2008 | Duyanovich et al. |
| 2008/0201779 A1 | 8/2008 | Tahan et al. |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jacoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0171871 A1 | 7/2009 | Zhang et al. |
| 2009/0193293 A1 | 7/2009 | Stolfo et al. |
| 2009/0193497 A1 | 7/2009 | Kikuchi et al. |
| 2009/0198997 A1 | 8/2009 | Yeap |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0043047 A1 | 2/2010 | Archer et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0074112 A1 | 3/2010 | Derr et al. |
| 2010/0077481 A1 | 3/2010 | Polyakov et al. |
| 2010/0077483 A1 | 3/2010 | Stolfo et al. |
| 2010/0082758 A1 | 4/2010 | Golan |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0055123 A1 | 3/2011 | Kennedy |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2011/0225644 A1 | 9/2011 | Pullikottil et al. |
| 2011/0283361 A1 | 11/2011 | Perdisci et al. |
| 2012/0079101 A1 | 3/2012 | Muppala et al. |
| 2012/0084860 A1 | 4/2012 | Cao et al. |
| 2012/0102568 A1 | 4/2012 | Tarbotton et al. |
| 2012/0117641 A1 | 5/2012 | Holloway |
| 2012/0143650 A1 | 6/2012 | Crowley et al. |
| 2012/0151585 A1 | 6/2012 | Lamastra et al. |
| 2012/0198549 A1 | 8/2012 | Antonakakis et al. |
| 2012/0215909 A1 | 8/2012 | Goldfarb et al. |
| 2013/0054802 A1 | 2/2013 | Donzis et al. |
| 2013/0174253 A1 | 7/2013 | Thomas et al. |
| 2013/0191915 A1 | 7/2013 | Antonakakis et al. |
| 2013/0232574 A1 | 9/2013 | Carothers |
| 2014/0059216 A1 | 2/2014 | Jerrim |
| 2014/0068763 A1 | 3/2014 | Ward et al. |
| 2014/0068775 A1 | 3/2014 | Ward et al. |
| 2014/0074838 A1 | 3/2014 | Akoglu et al. |
| 2014/0075558 A1 | 3/2014 | Ward et al. |
| 2014/0090058 A1 | 3/2014 | Ward et al. |
| 2014/0157414 A1 | 6/2014 | Antonakakis et al. |
| 2014/0289854 A1 | 9/2014 | Mahvi |
| 2014/0101759 A1 | 12/2014 | Nelms et al. |
| 2014/0373148 A1 | 12/2014 | Nelms et al. |
| 2015/0026808 A1 | 1/2015 | Perdisci et al. |
| 2015/0222654 A1 | 8/2015 | Crowley et al. |
| 2016/0285894 A1 | 9/2016 | Nelms et al. |

OTHER PUBLICATIONS

Kristoff, J. "Botnets, Detection and Mitigation: DNS-Based Techniques," NU Security Day 2005, 23 pages; www.it.northwestern.edu/bin/docs/bots_kristoff_jul05.ppt";.*

(56) References Cited

OTHER PUBLICATIONS

"Spamming Botnets: Signatures and Characteristics" Xie et al; ACM SIGCOMM. Settle. WA; 12 pages (Year: 2008).*
Cliff Changchun Zou et al., "Code Red Worm Propagation Modeling and Analysis", In Proceedings of 9th ACM Conference on Computer and Communications Security (CCS '02), Nov. 18, 2002.
Cliff C. Zou et al,. "Email Worm Modeling and Defense", In the 13th ACM International Confrerence on Computer Communications and Networks (CCCN '04), Oct. 27, 2004.
Cliff Changchun Zou et al., "Monitoring and Early Warning for Internet Worms", In Proceedings fo the 10th ACM Conference on Computer and Communications Security (CCS '03), Oct. 2003.
Cliff Changchun Zou et al., "On the Performance of Internet Worm Scanning Strategies", Technical Report TR-03-CSE-07, Umass ECE Dept., Nov. 2003.
Alexander Gostev, "Malware Elovution: Jan.-Mar. 2005", Viruslist.com, http://www.viruslist.com/en/analysis?pubid=162454316, (Apr. 18, 2005).
Jiang Wu et al., "An Effective Architecture and Algorithm for Detecting Worms with Various Scan Techniques", In Proceedings of the 11th Annual Network and Distributed System Security Symposium (NDSS '04), Feb. 2004.
Matthew M. Williamson et al., "Virus Throttling for Instant Messaging", Virus Bulletin Conference, Sep. 2004, Chicago, IL, USA, (Sep. 2004).
F. Weimer, "Passive DNS Replication", http://www.enyo.de/fw/software/dnslogger, 2005.
Ke Wang et al., "Anomalous Payload-Based Network Intrusion Detection", In Proceedings of the 7th International Symposium on Recent Advances in Intrusion Detection (RAID 2004), 2004.
P. Vixie et al,. "RFC 2136: Dynamic Updates in the Domain Name System (DNS Update)", http://www.faqs.org/rfcs.rfc2136.html (Apr. 1997).
Joe Stewart, "Dipnet/Oddbob Worm Analysis", SecureWorks, http://www.secureworks.com/research/threats/dipnet/ (Jan. 13, 2005).
Harold Thimbleby et al., "A Framework for Modeling Trojans and Computer Virus Infection", Computer Journal, vol. 41, No. 7, pp. 444-458 (1999).
Paul Bachner et al., "Know Your Enemy: Tracking Botnets", http://www.honeynet.org/papers/bots/, (Mar. 13, 2005).
"LockDown Security Bulletin—Sep. 23, 2001", http://lockdowncorp.com/bots/ (Sep. 23, 2001).
Colleen Shannon et al., "The Spread of the Witty Worm", http://www.caida.org/analysis/security/witty/index.xml (Mar. 19, 2004).
Moheeb Abu Rajab et al., "On the Effectiveness of Distributed Worm Monitoring", In Proceedings fo the 14th USENIX Security Symposium (2005).
Niels Provos, "CITI Technical Report 03-1: A Virtual Honeypot Framework", http://www.citi.umich.edu/techreports/reports/citi-tr-03-1.pdf (Oct. 21, 2003).
"Know your Enemy: Honeynets", http://www.honeypot.org/papers/honeynet, (May 31, 2006).
David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004).
David Moore et al., "Slammer Worm Dissection: Inside the Slammer Worm", IEEE Security & Privacy, vol. 1, No. 4 (Jul.-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart, "Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA, May 20-22, 1991; pp. 343-359 (May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
Thomer M. Gil, "NSTX (IP-over-DNS) Howto", http://thomer.com/howtos/nstx.html, Nov. 4, 2005 (5 pages).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagan.org/dynamic (Aug. 7, 2006).
Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
http://www.trendmicro.com/en/home/us/home.htm.
"InterCloud Security Service", http://www.trendmicro.com/en/products/nss/icss/evaluate/overview.html (2006) (2 pages).
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freiling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy, pp. 370-375.
Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun. 2005).

(56) References Cited

OTHER PUBLICATIONS

David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access For Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.
Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
DMOZ Open Directory Project, Dynamic DNS Providers List, http://dmoz.org/Computers/Software/Internet/Servers/Address_Management/Dynamic_DNS_Services/, Mar. 19, 2007 (3 pages).
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3il) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones et al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Stragetic Use of LaBrea", http://www.hackbusters.net/LaBrea/LaBrea.txt, Oct. 24, 2001.
R. Pointer, "Eggdrop Development", http://www.eggheads.org, Oct. 1, 2005.
S. Staniford, "Code Red Analysis Pages: July Infestation Analysis", http://silicondefense.org/cr/july.html, Nov. 18, 2001.
Alex Ma, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/ w32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 dated Jul. 8, 2008.
Written Opinion issued in Application No. PCT/US06/038611 dated Jul. 8, 2008.
International Preliminary Report on Patentability issued in Application No. PCT/US06/038611 dated Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the Domino Overlay System", Proceedings of Network and Distributed Security Symposium (NDSS), 17 pages Feb. 2004.
Vinod Yegneswaran et al., "On the Design and Use of Internet Sinks for Network Abuse Monitoring", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.

(56) References Cited

OTHER PUBLICATIONS

Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Stephan Axelsson, "The Base-Rate Fallacy and the Difficulty of Intrusion Detection", ACM Transactions on Information and System Security, vol. 3, No. 3, pp. 186-205 (Aug. 2000).
Neil Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.
Guofei Gu et al. "BotMiner: Clustering Analysis of Network Traffic Protocol- and Structure-Independent Botnet Detection", 2008, USENIX Security Symposium, pp. 139-154.
Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
Manos Antonakakis et al., "Building a Dynamic Reputation System for DNS", 19th USENIX Security Symposium, Aug. 11-13, 2010 (17 pages).
Manos Antonakakis et al., "Detecting Malware Domains at the Upper DNS Hierarchy", In Proceeding of the 20th USENIX Security Symposium, Aug. 8-12, 2011 (16 pages).
Leyla Bilge et al., "EXPOSURE: Finding Malicious Domains Using Passive DNS Analysis", 18th Annual Network and Distributed System Security Symposium, Feb. 6-9, 2011 (17 pages).
"Virus:Win32/Expiro.Z". http://www.microsoft.com/security/portal/Threat/Encyclopedia/Entry.aspx, Jun. 9, 2011 (5pages).
Mike Geide, "Another Trojan Bamital Pattern", http://research.zscaler.com/2011/05/another-trojan-bamital-pattern.html, May 6, 2011 (5 pages).
Sergey Golovanov et al., "TDL4—Top Bot", http://www.secuirlist.com/en/analysis/204792180/TDL4_Top_Bot, Jun. 27, 2011 (15 pages).
P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www.ietf.org/rfc/rfc1035.txt, Nov. 1987 (52 pages).
Phillip Porras et al. "SRI International Technical Report: An Analysis of Conficker's Logic and Rendezvous Points", http://mtc.sri.com/Conficker/, Mar. 19, 2009, (31 pages).
Phillip Porras et al. "SRI International Technical Report: Conficker C Analysis", http://mtc.sri.com/Conficker/addendumC, Apr. 4, 2009, (24 pages).
Paul Royal, Damballa, "Analysis of the Kracken Botnet", Apr. 9, 2008 (13 pages).
Sergei Shevchenko, "Srizbi's Domain Calculator", http://blog.threatexpert.com/2008/11/srizbix-domain-calculator.html, Nov. 28, 2008 (3 pages).
Sergei Shevchenko, "Domain Name Generator for Murofet", http://blog.threatexpert.com/2010/10/domain-name-generator-for-murofet.html, Oct. 14, 2010 (4 pages).
P. Akritidis et al., "Efficient Content-Based Detection of Zero-Day Worms", 2005 IEEE International Conference in communications, vol. 2, pp. 837-843, May 2005.

M. Patrick Collins et al., "Hit-List Worm Detection and Bot Identification in Large Networks Using Protocol Graphs", RAID 2007, LNCS 4637, pp. 276-295 (2007).
Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of The 19th Annual Computer Security Application Conference (ACSAC'03), (11 pages) (2003).
Lala A. Adamic et al., "Zipf's Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.
Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.
Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative Intrusion Detection Framework", In Proceedings of IEEE Symposium on Security and Privacy 2002, pp. 202-215 (2002).
David Dagon et al., "Modeling Botnet Propagation using Time Zones", The 13th Annual Network and Distributed System Security Symposium 2006, Feb. 2-3, 2006 (18 pages).
Roger Dingledine et al., "Tor: The Second-Generation Onion Router", In Proceedings of the 13th Usenix Security Symposium, pp. 303-320 Aug. 9-13, 2004.
Steven T. Eckman et al., "STATL: An Attack Language for State-Based Intrusion Detection", Journal of Computer Security, vol. 10, pp. 71-103 (2002).
Daniel R. Ellis, et al., "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).
Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms Via Behavioral Footprinting", WORM'06, Nov. 3, 2006 (7 pages).
Giovanni Vigna et al., "NetSTAT: A Network-based Intrusion Detection Approach", In Proceedings of the 14th Annual Computer Security Applications Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).

(56) References Cited

OTHER PUBLICATIONS

Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", www.damballa.com/downloads/r_pubs/KrakenWhitepaper.pdf (2008) (3pages).
Robert Perdisci et al., "Behavioral Clustering of HTTP-Based Malware and Signature Generation Using Malicious Network Traces", Usenix Symposium on Networked Systems Design and Implementation (NSDI 2010), (2010) (16 Pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant to Mimicry Attack", In Proceedings of the International Symposium on Recent Advances in Intrusion Detection (RAID) (2006) (20 pages).
Ke Wang et al., "Anomalous Payload-Based Worm Detection and Signature Generation", In Proceedings of the International Symposium on Recent Advances in Intrusion Detection (RAID) (2005) (20 pages).
David Whyte, "Exposure Maps: Removing Reliance on Attribution During Scan Detection", 1st Usenix Workshop on Hot Topics in Security, pp. 51-55 (2006).
Jiahai Yang et al., "CARDS: A Distributed System for Detecting Coordinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al., "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/index.php, updated Oct. 13, 2012 (1 page).
Shuang Hao et al., "An Internet-Wide View into DNS Lookup Patterns", http://labs.verisign.com/projects/malicious-domain-names/white-paper/dns-imc2010.pdf (2010) (6 pages).
Thorsten Holz et al., "Measuring and Detecting Fast-Flux Service Networks", In Proceedings of NDSS (2008) (12 pages).
Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Analysis of a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What We Know (and Learn) for the Waledac Takedown", http://blogs.technet.com/b/mmpc/archive/2010/03/15/what-we-know-and-learned-from-the-waledac-takedown.aspx, Mar. 15, 2010 (2 pages).
"Trojan:Java/Boonan", http://microsoft.com/security/portal/threat/encyclopedia/entry.aspx?Name=Trojan%3AJava%2FBoonan, Apr. 17, 2011 (5 pages).

Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Sandeep Yadav et al., "Detecting Algorithmically Generated Malicious Domain Names", In Proceedings of the 10th Annual Conference on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, A Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.
Michael Hale Ligh et al., "Malware Analyst's Cookbook and DVD", Wiley, 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006.
C. VVillems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Simon Urbanek, "rJava: Low-Level-R to Java Interface", printed May 6, 2013 (5 pages).
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al,. "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/papers/attacks2.pdf, 2007 (17 pages).

(56) References Cited

OTHER PUBLICATIONS

Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).
Rich Uhlig et al., "Intel Virualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisiblethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).
Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.

John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Malware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).
"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communications Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.
"W32/IRCBot-TO", http://www.sophos.com/virusinfo/analyses.w32ircbotto.html, Jan. 19, 2007 (1 page).

(56) References Cited

OTHER PUBLICATIONS

Stuart Staniford et al., "Practical Automated Detection of Stealthy Portscans", Journal of Computer Security, vol. 10, pp. 105-136 (2002).
S. Staniford-Chen et al., "GrIDS—A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).
Mark Felegyhazi et al., "On the Potential of Proactive Domain Blacklisting", In the Third Usenix LEET Workshop (2010) (8 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).
Guofei Gu et al. "Bothunter: Detecting Malware Infection Through IDS-Driven Dialog Correlation", Proceedings of 16th USENIX Security Symposium, pp. 167-182 (2007).
The Conficker Working Group,"Conficker Working Group: Lessons Learned", Conficker_Working_Group_Lessons_Learned_17_June _2010_final.pdf", published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).
R. Arends et al., "Protocol Modifications for the DNS Security Extensions", htp://www.ietf.org/rfc/rfc4035.txt, Mar. 2005 (50 pages).
R. Arends et al., "DNS Security Introduction and Requirements", htp://www.ietf.org/rfc/rfc4033.txt, Mar. 2005 (20 pages).
R. Arends et al., "Resource Records for the DNS Security Extensions", htp://www.ietf.org/rfc/rfc4034.txt, Mar. 2005 (28 pages).
Andreas Berger et al., "Assessing the Real-World Dynamics of DNS", Lecture Notes in Computer Science, vol. 7189, pp. 1-14 (2012).
Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).

Nicolas Falliere et al., "W32.Stuxnet Dossier", http://www.symantec.com/content/en/us/enterprise/media/security_response/whitepapers/w32_stuxnet_dossier.pdf, Feb. 2011 (69 pages).
Steinar H. Gunderson, "Global IPv6 Statistics: Measuring the Current State of IPv6 for Ordinary Users", http://meetings.ripe.net/ripe-57/presentations/Colitti-Global IPv6 statistics_—_Measuring _the_current_state_of_IPv6 for_ordinary_users_.7gzD.pdf, Oct. 24-30, 2008 (20 pages).
Jaeyeon Jung et al., "Modeling TTL-Based Internet Caches", IEEE INFOCOM 2003, pp. 417-426, Mar. 2003.
Srinivas Krishnan et al., "DNS Prefetching and Its Privacy Implications: VVhen Good Things Go Bad", In Proceeding of the 3rd USENIX Conference on Large-Scale Exploits and Emergent Threats: Botnets, Spyware, Worms, and More (LEET'10), (2010) (9 pages).
Zhuoqing Morley Mao et al., "A Precise and Efficient Evaluation of the Proximity Between Web Clients and Their Local DNS Servers", In Proceedings of USENIX Annual Technical Conference (2002) (14 pages).
Mozilla Foundation, "Public Suffix List", http://publicsuffix.org/, printed May 23, 2013 (8 pages).
David Plonka et al., "Context-Aware Clustering of DNS Query Traffic", In Proceedings of the 8th IMC (2008) (13 pages).
RSA FraudAction Research Labs, "Anatomy of an Attack", http://blogs/rsa.com/rivner/anatomy-of-an-attack/, Apr. 1, 2011 (17 pages).
Steve Souders, "Sharing Dominant Domains", http://www.stevesouders.com/blog/2009/05/12/sharding-dominant-domains, May 12, 2009 (3 pages).
Paul Vixie, "What DNS Is Not", Communications of the ACM, vol. 52, No. 12, pp. 43-47, Dec. 2009.
N. Weaver et al., "Redirecting DNS for Ads and Profit", In USENIX Workshop on Free and Open communications on the Internet (FOCI), Aug. 2011 (6 pages).
Florian Weimer, "Passive DNS Replication", In Proceedings of the 17th Annual First Conference on Computer Security Incident, Apr. 2005 (13 pages).
Manos Antonakakis et al., "Unveiling the Network Criminal Infrastructure of TDSS/TDL4", http://www.damballa.com/downloads/r_pubs/Damballa_tdss_tdl4_case_study_public.pdf, (undated) (16 pages).
Manos Antonakakis et al., "From Throw-Away Traffic to Bots: Detecting the Rise of DGA-Based Malware", In Proceedings of the 21st USENIX Conference on Security Symposium (Security'12), (2012) (16 pages).
T. Berners-Lee et al., "RFC3986—Uniform Resource Identifier (URI): Generic Syntax", http://www.hjp.at/doc/rfc/rfc3986.html, Jan. 2005 (62 pages).
Juan Caballero et al., "Measuring Pay-Per-Install: The Commoditization of malware Distribution", In Proceedings of the 20th USENIX Conference on Security (SEC'11), (2011) (15 pages).
Chih-Chung Chang et al., "LIBSVM: A Library for Support Vector Machines" ACM Transactions on Intelligent Systems and Technology 2011, Last Updated Jun. 14, 2007 (26 pages).
Dancho Danchev, "Leaked DIY Malware Generating Tool Spotted in the Wild", http://blog.webroot.com/2013/01/18/leaked-diy-malware-generating-tool-spotted-in-the-wild/, Jan. 18, 2013 (6 pages).
D. De La Higuera et al., "Topology of Strings: Median String is NP-Complete", Theoretical Computer Science, vol. 230, pp. 39-48 (2000).
Robert Edmonds, "ISC Passive DNS Architecture", http://kb.isc.org/getAttach/30/AA-00654/passive-dns-architecture.pdf, Mar. 2012 (18 pages).
Manuel Egele et al., "A Survey on Automated Dynamic Malware-Analysis Techniques and Tools", ACM Computing Surveys, vol. 44, No. 2, Article 6, pp. 6:1-6:42, Feb. 2012.
Dennis Fisher, "Zeus Source Code Leaked", http://threatpost.com/en_us/blogs/zeus-source-code-leaked-051011, May 10, 2011 (6 pages).
Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).

(56) References Cited

OTHER PUBLICATIONS

Grefoire Jacob, "Jackstraws: Picking Command and Control Connections from Bot Traffic", In Proceedings of the 20th USENIX Conference on Security (SEC'11) (2011) (16 pages).
Jiyong Jang et al., "Bitshred: Feature Hashing Malware for Scalable Triage and Semantic Analysis", In Proceedings of the 18th ACM Conference on Computer and Communications Security (CCS'11), pp. 309-320, Oct. 17-21, 2011.
J. Zico Kolter et al., "Learning to Detect and Classify Malicious Executables in the Wild", Journal of Machine Learning Research, vol. 7, pp. 2721-2744, Dec. 2006.
John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.
Team Cymru, "Developing Botnets", http://www.team-cymru.com/ReadingRoom/Whitepapers/2010/developing-botnets.pdf (2010) (3 pages).
Brett Stone-Gross et al., "Pushdo Downloader Variant Generating Fake HTTP Requests", http://www.secureworks.com/cyber-threat-intelligence/threats/Pushdo_Downloader_Variant_Generating_Fake_HTTP_Requests/, Aug. 31, 2012 (4 pages).
Peter Wurzinger et al., "Automatically Generating Models for Botnet Detection", In Proceedings of the 14th European Conference on Research in Computer Security (ESORICS'09), pp. 232-249 (2009).
Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.
Yajin Zhou et al., "Dissecting Android Malware: Characterization and Evolution", 2012 IEEE Symposium on Security and Privacy, pp. 95-109 (2012).
Nello Cristianini et al., "An Introduction to Support Vector Machines: and other Kernal-Based Learning Methods", Cambridge University Press, New York, NY, USA (2000).
Timo Sirainen, "IRSSI", http://en.wikipedia.org/wiki/Irssi, updated May 8, 2013 (3 pages).
Team Cymru, "IP to ASN Mapping", http://www.team-cymru.org/Services/ip-to-asn.html, printed Mar. 23, 2013 (6 pages).
http://www.bleedingsnort.com, retrieved from Internet Archive on May 23, 2013, Archived Sep. 26, 2006 (3 pages).
http://www.dshield.org, retrieved from Internet Archive on May 23, 2013, Archived Sep. 29, 2006 (2 pages).
http://www.alexa.com, retrieved from Internet Archive on May 23, 2013, Archived Sep. 25, 2006 (3 pages).
https://sie.isc.org/, retrieved from Internet Archive on May 23, 2013, Archived Dec. 29, 2008 (2 pages).
http://damballa.com, retrieved from Internet Archive on May 23, 2013, Archived Jan. 28, 2007 (10 pages).
http://www.dnswl.org, retrieved from Internet Archive on May 23, 2013, Archived Jul. 15, 2006 (4 pages).
http://www.spamhaus.org/sbl/, retrieved from Internet Archive on May 23, 2013, Archived Sep. 24, 2006 (24 pages).
http://malwaredomains.com, retrieved from Internet Archive on May 23, 2013, Archived Dec. 28, 2007 (12 pages).
http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from Internet Archive on May 23, 2013, Archived Sep. 29, 2006 (13 pages).
https://alliance.mwcollect.org, retrieved from Internet Archive on May 23, 2013, Archived Jan. 7, 2007 (2 pages).
http://malfease.oarci.net, retrieved from Internet Archive on Apr. 11, 2014, Archived Apr. 12, 2008 (2 pages).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
Thomas Ptacek, "Side-Channel Detection Attacks Against Unauthorized Hypervisors", http://www.matasano.com/log/930/side-channel-detection-attacks-against-unauthorized-hypervisors/, Aug. 20, 2007, retrieved from Internet Archive on May 23, 2013, Archived Aug. 27, 2007 (12 pages).
http://cyber-ta.org/releases/botHunter/index.html, retrieved from Internet Archive on May 23, 2013, Archived Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 ( pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications", Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC", http://en.wikipedia.org/wiki/Windows_Virtual_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in The Third USENIX Left Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).

(56) References Cited

OTHER PUBLICATIONS

Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Mekky et al. (Detecting Malicious HTTP Redirections Using Trees of User Browser Activity, IEEE INFOCOM 2014, pp. 1159-1167).
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153 (2010).
File History of U.S. Appl. No. 11/538,212.
File History of U.S. Appl. No. 12/538,612.
File History of U.S. Appl. No. 12/985,140.
File History of U.S. Appl. No. 13/008,257.
File History of U.S. Appl. No. 13/205,928.
File History of U.S. Appl. No. 13/309,202.
File History of U.S. Appl. No. 13/358,303.
File History of U.S. Appl. No. 13/749,205.
File History of U.S. Appl. No. 14/010,016.
File History of U.S. Appl. No. 14/015,582.
File History of U.S. Appl. No. 14/015,621.
File History of U.S. Appl. No. 14/015,663.
File History of U.S. Appl. No. 14/015,704.
File History of U.S. Appl. No. 14/015,661.
File History of U.S. Appl. No. 14/041,796.
File History of U.S. Appl. No. 14/096,803.
File History of U.S. Appl. No. 14/194,076.
File History of U.S. Appl. No. 14/304,015.
File History of U.S. Appl. No. 14/305,998.
File History of U.S. Appl. No. 14/317,785.
File History of U.S. Appl. No. 14/668,329.
File History of U.S. Appl. No. 14/616,387.
Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.

\* cited by examiner

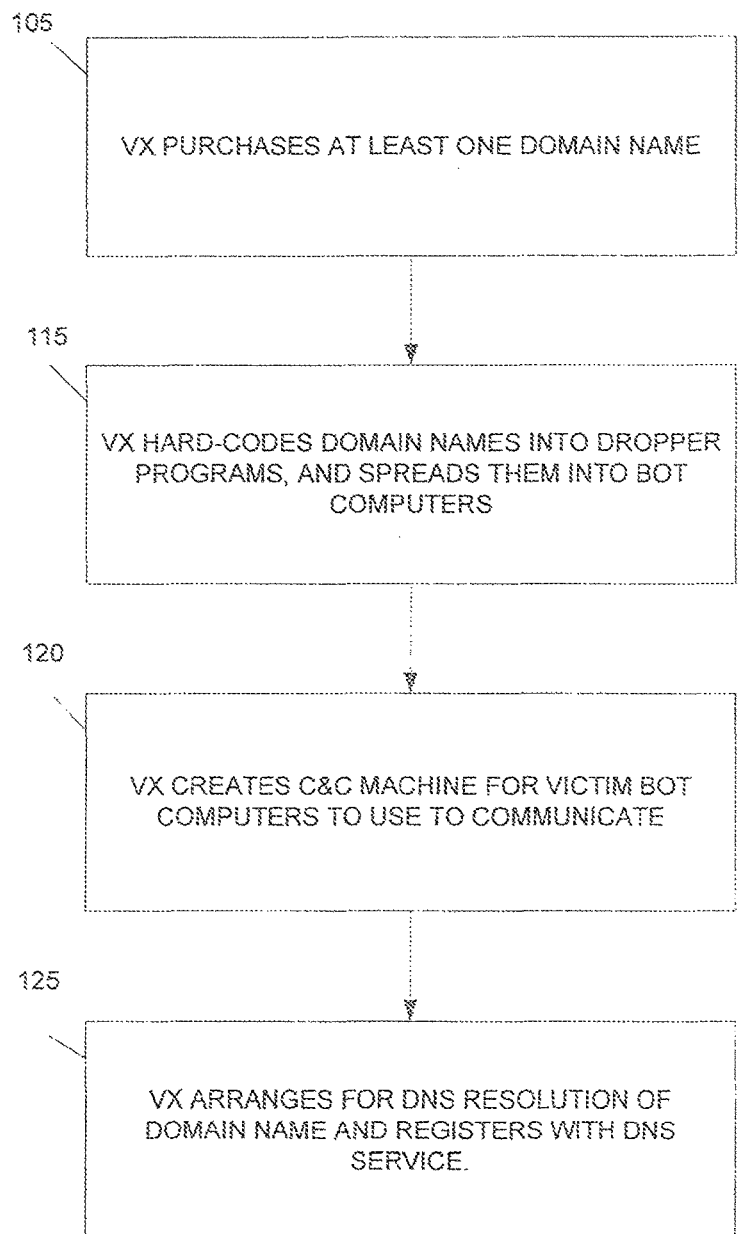

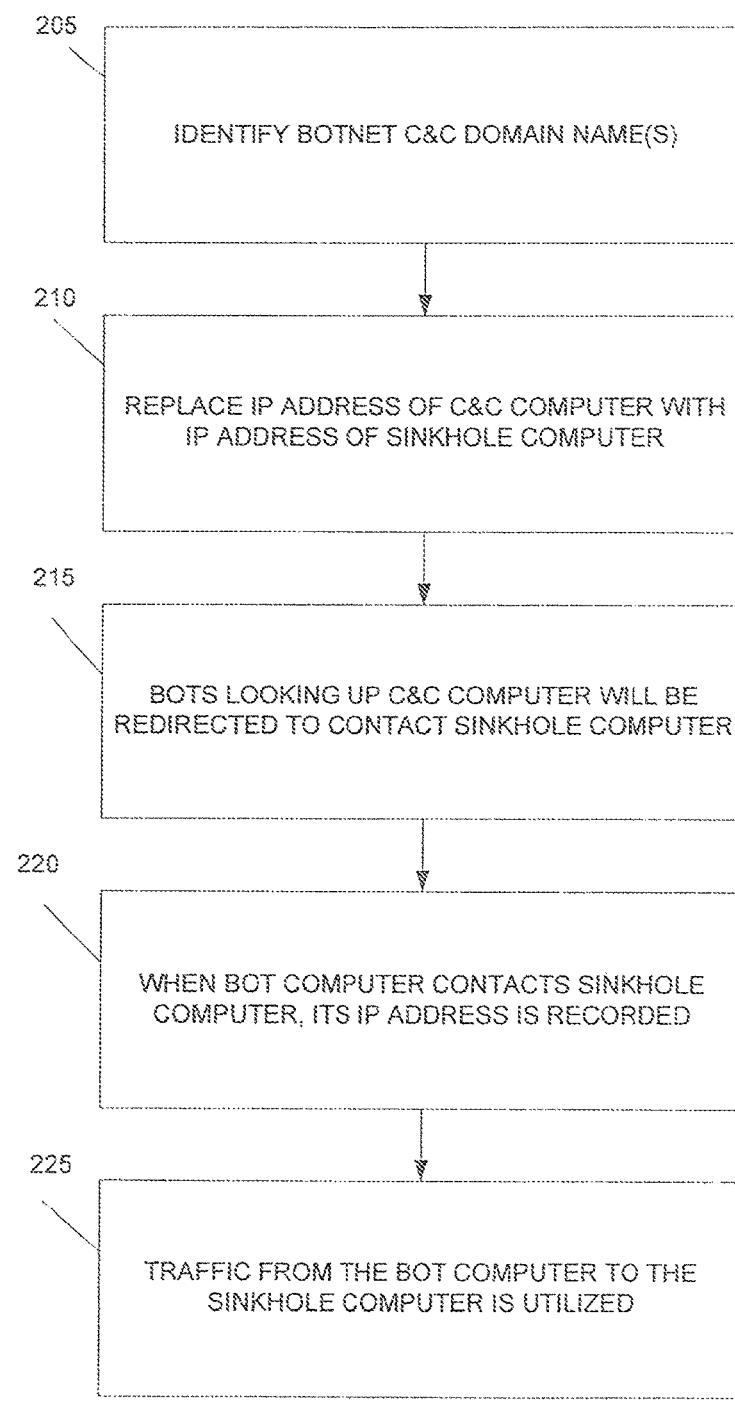

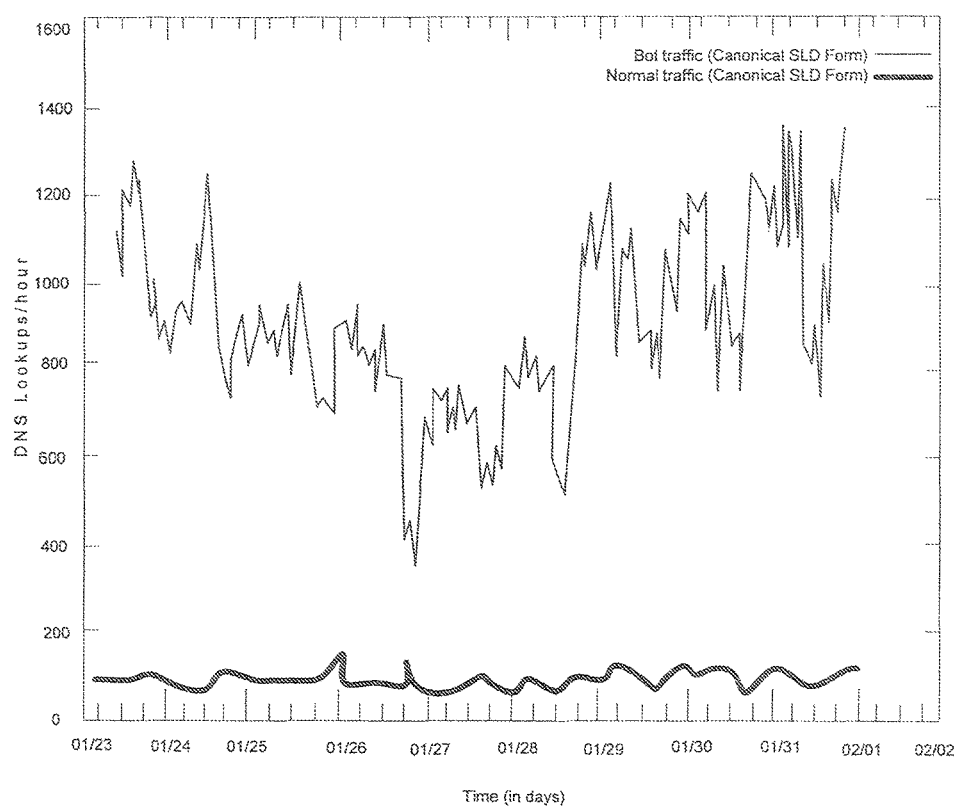

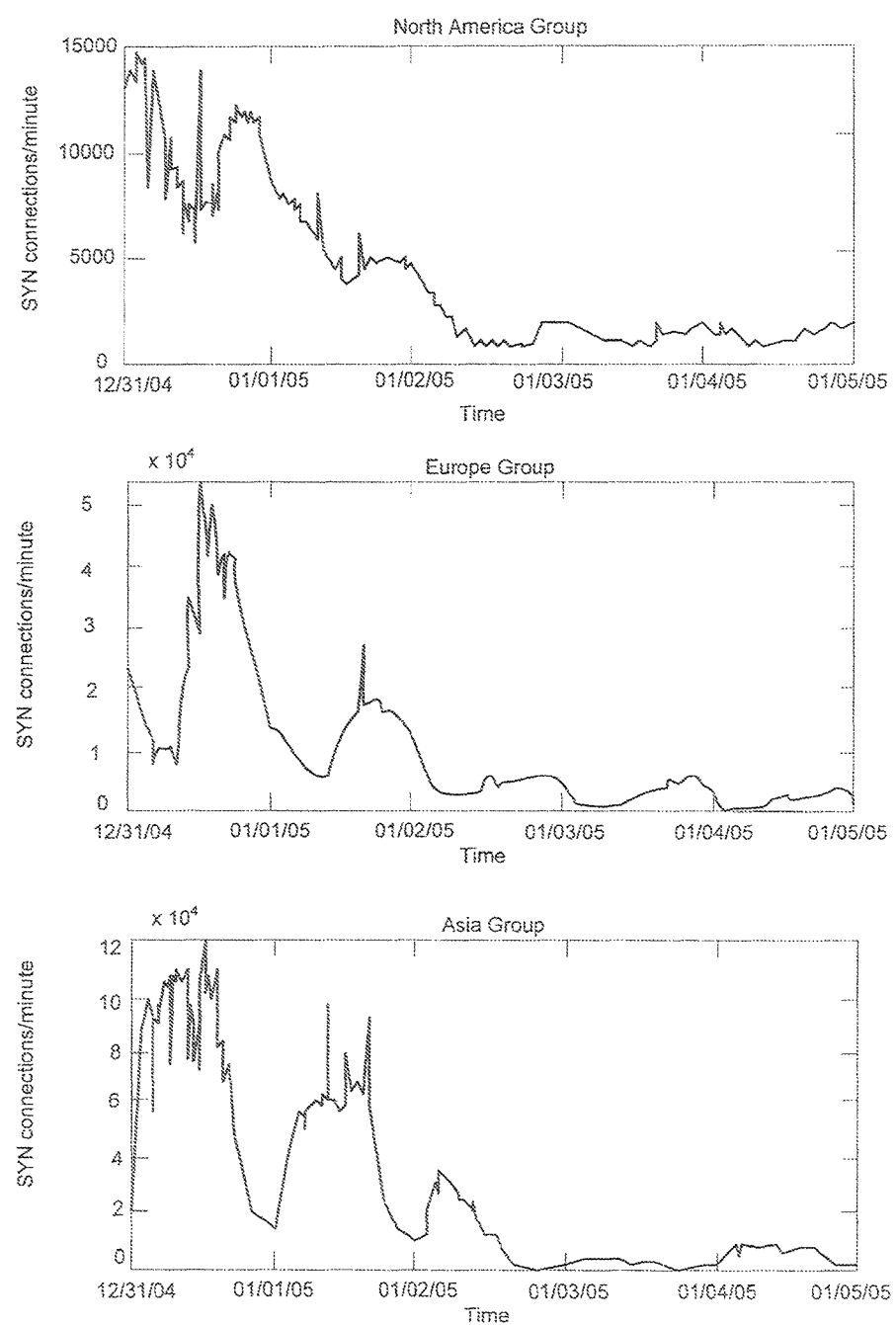

| Node | ASN of Node | Out-Degree | # of Children at Sinkhole |
|------|-------------|------------|---------------------------|
| 1 | Everyone's Internet (AS 13749) | 36,875 | 12 |
| 2 | Iquest (AS 7332) | 32,159 | 7 |
| 3 | UUNet (AS 701) | 31,682 | 5 |
| 4 | UPC Broadband (AS 6830) | 26,502 | 8 |
| 5 | E-xpedient (AS 17054) | 19,530 | 4 |

FIGURE 16

```
CONSTRUCTGRAPH()
create empty directed graph G

//Parsing
for each DNSBL query:
        Identify querier and queried

//Pruning
    if querier in B or queried in B then
        add querier and queried to G if they
            are not already members of G
        if there exists an edge E (querier, queried) in G then
            increment the weight of that edge
        else
            add E (querier, queried) to G with weight 1
```

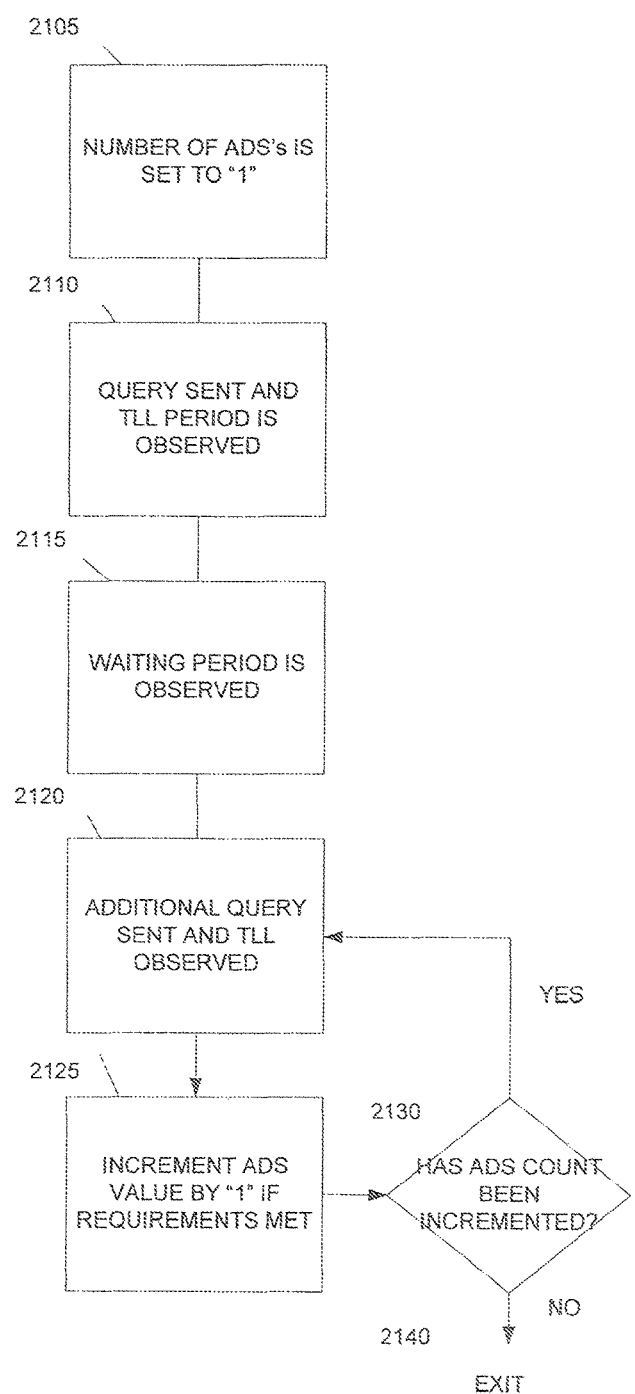

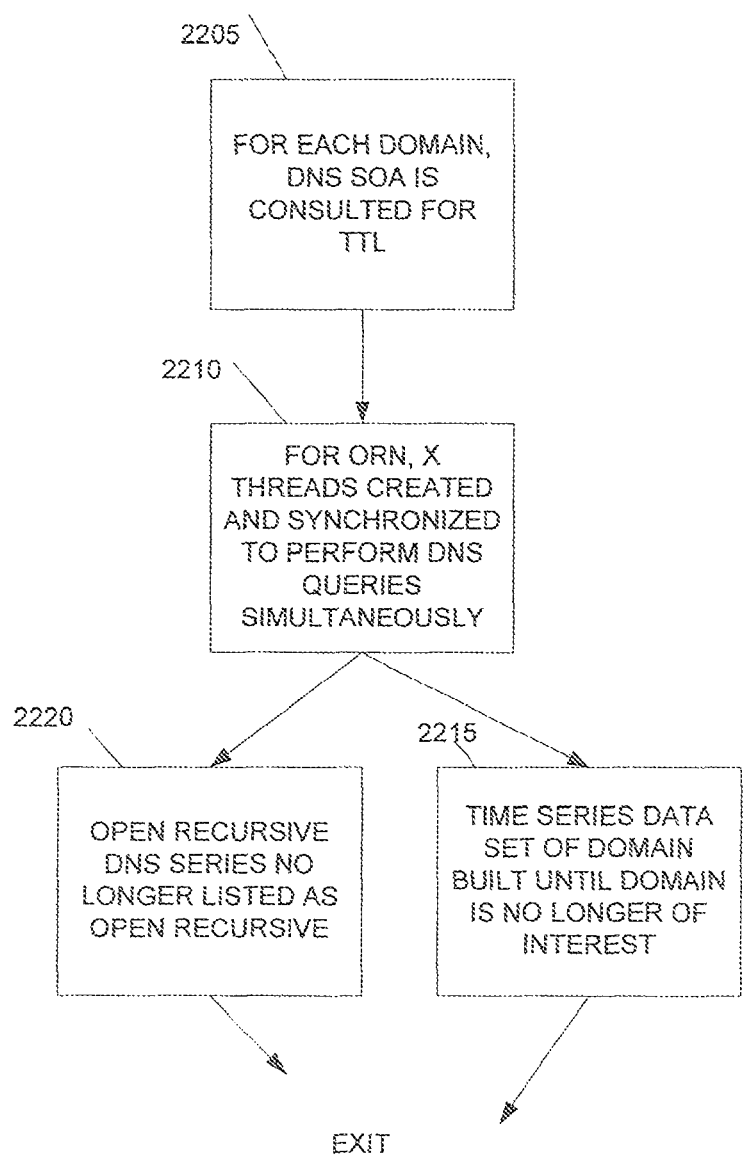

METHODS AND SYSTEMS FOR DETECTING COMPROMISED COMPUTERS

This application is a Continuation of U.S. patent application Ser. No. 11/015,661 filed Aug. 30, 2013, which is a Continuation of U.S. patent application Ser. No. 11/538,212, filed Oct. 3, 2006 (now U.S. Pat. No. 8,566,928 issued Oct. 22, 2013, which claims priority to U.S. Provisional Application No. 60/730,615, entitled "Method to detect and respond to attacking networks," filed on Oct. 27, 2005, and U.S. Provisional Application No. 60/799,248, entitled "Revealing botnet membership using DNSBL counter-intelligence," filed on May 10, 2006. All of the foregoing are incorporated by reference in their entireties.

This application is supported in part by NSF grant CCR-0133629, Office of Naval Research grant N000140410735, and Army Research Office contract W911NF0610042.

BRIEF DESCRIPTION OF THE DRAWINGS

FIGS. 1A and 1B illustrates a system and method for botnet creation.

FIGS. 2A-9B illustrate several methods of detecting and disrupting botnets using DNS monitoring and sinkholing, according to several embodiments of the invention.

FIGS. 10-16 illustrate several methods for detecting and disrupting botnets using DNSBL monitoring, according to several embodiments of the invention.

FIGS. 17-22 illustrates methods for detecting and disrupting botnets using DNS cache snooping, according to several embodiments of the invention.

DESCRIPTION OF EMBODIMENTS OF THE INVENTION

Dynamic DNS Monitoring and Sinkholding

In one embodiment, the present invention is a method and system for identifying and/or attacking botnets. A bot is a robot or compromised computer that is used to carry out an attack. Examples of attacks include, but are not limited to, Distributed Denial of Service (DDOS) attacks, hosting distributed phishing pages, and key cracking. A botnet is a collection of bots. Botnets are composed of the bot victims reaped from different viruses, worms and Trojans. Thus, botnets are often referred to as viruses, worms or Trojans, depending on the context. The original infections compel the victim bots to run bot programs, which allow for remote administration.

Botnet Creation

Figure 1A:
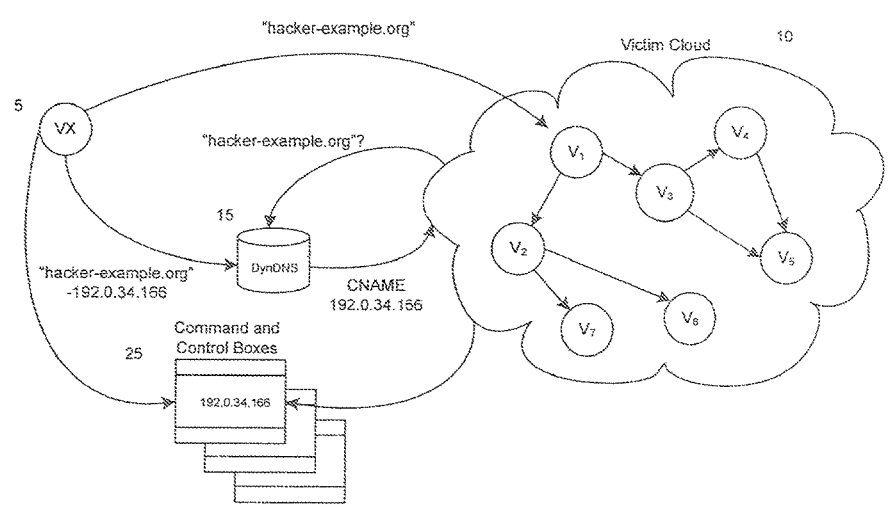

To better understand how to detect and respond to botnets, an example pattern of botnet creation is presented in FIGS. 1A and 1B. FIG. 1A illustrates a system of botnets utilized in an attack. FIG. 1A illustrates a malware author 5, a victim cloud of bot computers 10, a Dynamic Domain Name System (DDNS) server 15, and a Command & Control (C&C) computer 25. Upon infection, each bot computer 10 contacts the C&C computer 25. The malware author 5 (i.e., a hacker, denoted as VX) uses the C&C computer to observe the connections and communicate back to the victim bot computers 10. Often, more than one C&C computer 25 is used. If not, a single abuse report can cause the C&C computer 25 to be quarantined or the account suspended. Thus, malware authors use networks of computers to control their victim bot computers 10. Internet Relay Chat (IRC) networks are often utilized, as they are very resilient, and designed to resist hacker attacks. Because many public IRC networks are now patrolled by hacker-resistant software, botnets are migrating to private, non-IRC compliant services. In addition, malware authors 5 often try to keep their botnets mobile by using DDNS service 15, a resolution service that facilitates frequent updates and changes in computer locations. Each time the botnet C&C computer 25 is shut down by authorities, the botnet authors merely create a new C&C computer 25, and update the DDNS entry. The bot computers 10 perform periodic DNS queries and migrate to the new C&C location. This practice is known as bot herding.

FIG. 1B illustrates a method of utilizing botnets for an attack. In 105, the malware author 5 (e.g., VX) purchases one or more domain names (e.g., example.com), perhaps using a stolen account. The newly purchased domain names are initially parked at 0.0.0.0 (reserved for unknown addresses). A DNS or DDNS service can be used, in one embodiment. In 115, the malware author 5 hard-codes the purchased domain names into dropper programs, which are sent to the victim bot computers 10 so that the victim bot computers 10 will contact the domain name servers. The dropper programs are programs that have been designed or modified to install a worm and/or virus onto a victim bot computer 10. In 120, the malware author 5 creates a C&C computer 25 for victim bot computers 10 to use to communicate. The C&C computer 25 can be, for example, a high-bandwidth compromised computer, or a high-capacity co-located box. The C&C computer 25 can be set up to run an IRC service to provide a medium for the bots to communicate. Note that other services can be used, such as, but not limited to: web services, on-line news group services, etc. In 125, the malware author 5 will arrange for DNS resolution of domain name and register with DDNS service 15. The IP address provided for in the registration is for the C&C computer 25. As DNS propagates, more victim bot computers 10 join the network, and within a day, the bot army swells. The victims who contact the C&C computer 25 are compelled to perform a variety of tasks, such as, for example, but not limited to: updating their Trojans, attacking other computers, etc. When a DDNS server revokes a contract for DNS service, the malware author 5 (i.e., botmaster) just moves on, and secures DNS from yet another company. If the co-location service revokes the C&C contract (or cleans the box, in the case where the malware author 5 has used a compromised C&C computer 25), the malware author 5 just rents or steals another C&C computer 25.

Detecting Botnets

Figure 2A:
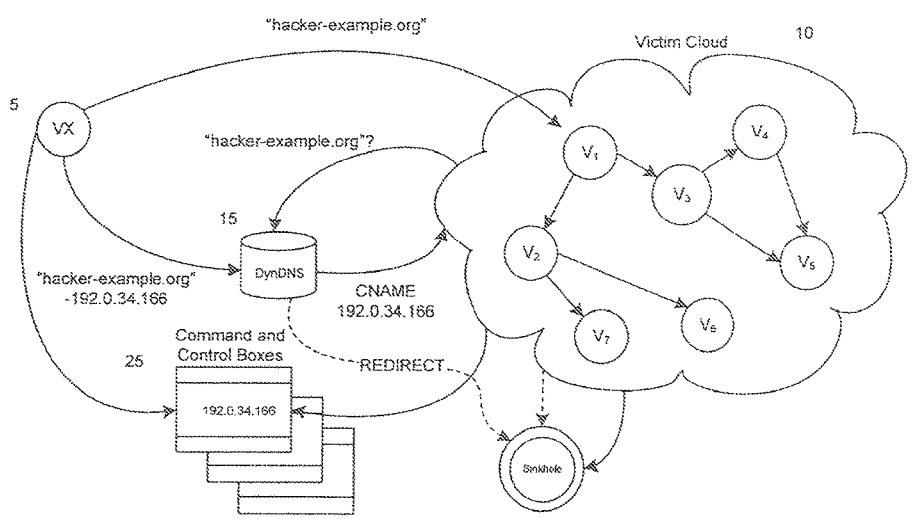
Figure 2C:
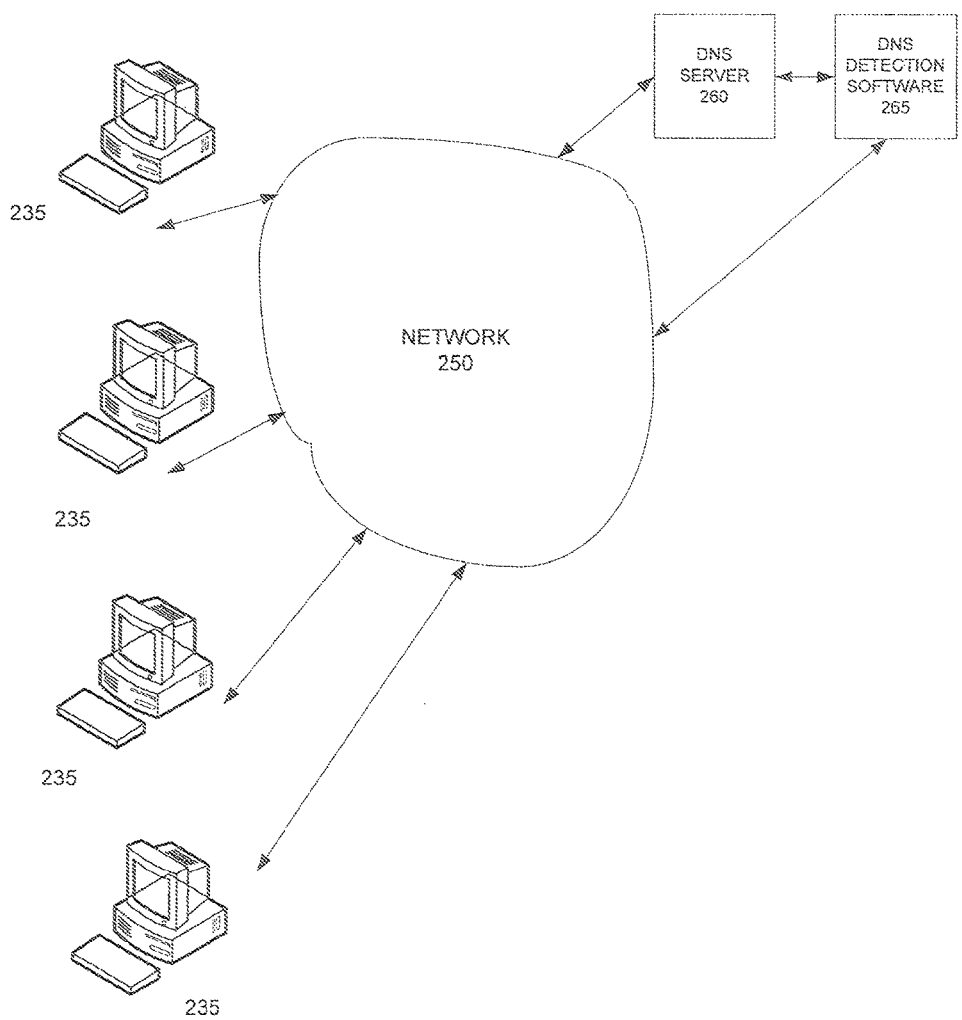

FIGS. 2A-2C illustrate a system and method of detecting and disrupting the communications between botnets and their victim bot computers 10.

FIG. 2C illustrates A system for detecting a first network of compromised computers in a second network of computers, comprising: a computer including DNS detection software 265, adapted to be connected to a network 250 and DNS data for the network 250, the DNS detection software 265 capable of: collecting DNS data for the network 250; examining the collected data relative to DNS data from known comprised and/or uncompromised computers 235 in the network 250; and determining the identity of compromised computers in the network 250 based on the examination.

FIG. 2A, as does FIG. 1A, illustrates a malware author 5, a victim cloud of bot computers 10, a Dynamic Domain Name System (DDNS) server 15, and a Command & Control (C&C) computer 25. However, FIG. 2A also includes a sinkhole computer 20. The IP address of the C&C computer 25 is replaced with the IP address of the sinkhole computer 20. The sinkhole computer is used to hold traffic redirected from another computer. This way, the network of bot computers 10 is isolated from the C&C computer(s), and the botnet loses the ability to act as a coordinated group. Although it is also helpful to clean up the victim computers, this requires coordination among different networks and can take time. However, disrupting the C&C can deal an immediate blow to the botnet.

FIG. 2B illustrates the method of detecting and disrupting the communications between botnets and their victim bot computers 10. In 205, the Command and Control (C&C) computer 25 of the botnet (network of attacking compromised computers) is identified, as explained below with respect to FIG. 3. In 210, the IP address of the C&C computer 25 is replaced with the IP address of the sinkhole computer 20. In 215, the bot computers 10 looking up the C&C computer 25 will be told to contact the sinkhole computer 20 instead. In 220, when a bot computer 10 contacts the sinkhole computer 20, the sinkhole computer 20 will record the IP address of the bot computer 10. In 225, traffic from the bot computers 10 to the sinkhole computer 20 can be utilized to detect and disrupt communications in the botnet.

Figure 3:
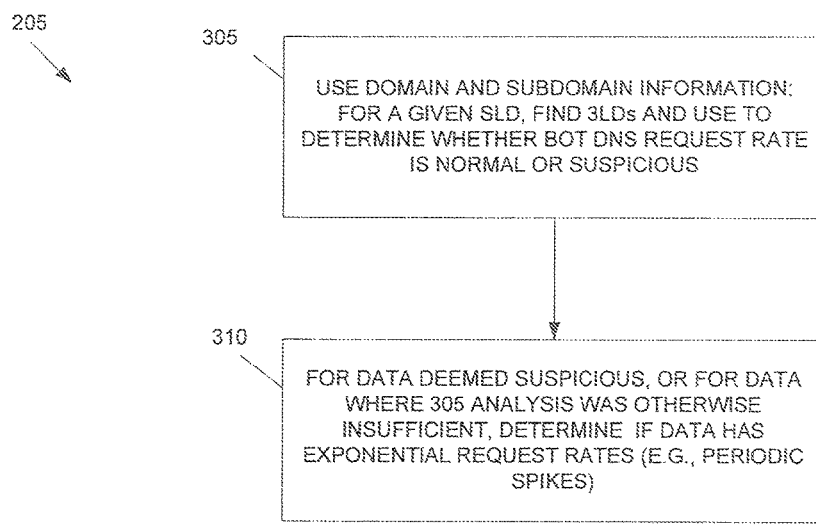

FIG. 3 illustrates how a botnet's C&C computer can be identified. In 305, domain and subdomain information is used to determine whether a bot computer's DNS (Dynamic Name System) request rate is normal or suspicious. In 310, if the bot computer's DNS request rate is determined to be suspicious, it is determined if it has an exponential request rate (e.g., periodic spikes). In addition, the exponential request rate can also be utilized when the first filter of 305 is otherwise ineffective, such as, but not limited to, for analysis of low-and-slow spreading worms and/or viruses.

Figure 4A:
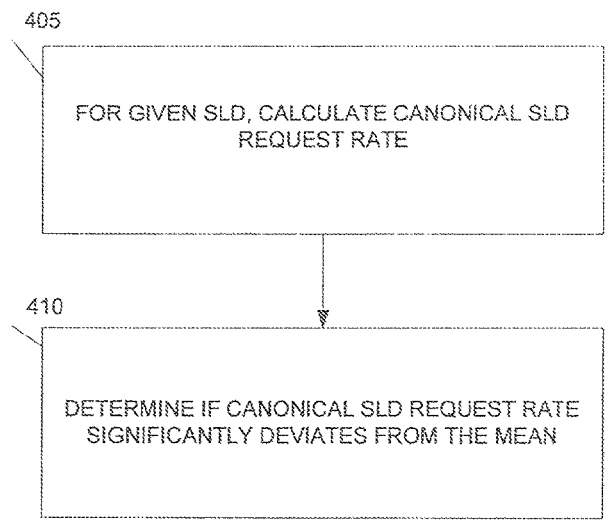

FIG. 4A illustrates the details of how the domain and subdomain information is used to determine whether a bot's DNS request rate is normal, as set forth above in 305. A DNS is a hierarchical system by which hosts on the Internet have both domain name addresses, such as "example.com", and IP addresses (such as 192.17.3.4). When a user types in a DNS name ("example.com"), a DNS application makes a DNS request by passing the DNS name and waiting for a response, such as the corresponding IP address or an error. DNS requests can be classified as either second-level domain (SLD) requests, such as "example.com", or third-level subdomain requests (3LD), such as "foo.example.com". To avoid increased costs and additional risks, botmasters often create botnets within 3LDs, all under a common SLD. For example, a botmaster may purchase the string "example.com" from a registrar, and then also purchase DDNS service for the 3LDs "botnet1.example.com", "botnet2.example.com", and so on. The botmasters use subdomains in order to avoid the purchase of a new domain name with each new botnet, e.g., "example1.com", "example2.com". Each purchase of a domain and name service involves risk. For example, the seller may be recording the originating IP for the transaction, and requiring the bot master to use numerous stepping stones. Some registrars are careful about screening and validating the "whois" contact information provided by the domain purchaser. If the purchase is performed with stolen user accounts, there is a further risk of being caught. Since many DDNS providers offer subdomain packages (e.g., a few free subdomains with DDNS service) this allows the botmaster to reuse their purchased domain and minimize both their costs and risk.

Botmasters also see another advantage in using subdomains. Even if service to a 3LD is suspended, service to other 3LDs within the same SLD is usually not disrupted. So, if "obtnet1.example.com" is sent to sinkhole computer, traffic to "normaluser.example.com" and "botnet2.example.com" is not disrupted. (Some DDNS providers may aggressively revoke accounts for the entire SLD, however, depending on the mix of users.) This lets botmasters create multiple, redundant DDNS services for their networks, all using the same SLD.

By comparison, most normal users usually do not employ subdomains when adding subcategories to an existing site. For example, if a legitimate company owns "example.com" and wants to add subcategories of pages on their web site, they are more likely to expand the URL (e.g., "example.com/products") instead using a 3LD subdomain (e.g., "products.example.com"). This lets novice web developers create new content cheaply and quickly, without the need to perform complicated DNS updates (and implement virtual host checking in the web server) following each change to a web site.

Thus, normal users tend to have a single domain name (with subcategories of content hanging off the URL), while bot computers tend to use mostly subdomains. Of course, botmasters could decide to exclusively use SLDs for their botnets instead of 3LDs, but this doubles their cost (because each domain name must be purchased in addition to the original SLD) and increases the number of potentially risky financial transactions (that may lead to traceback) required to create the network.

Thus, to determine the number of 3LDs, in 405, for a given SLD, the canonical SLD DNS request rate is calculated. The canonical SLD request rate is defined as the total number of requests observed for all the 3LDs present in a SLD, plus any request to the SLD. We use the term |SLD| to represent the number of 3LDs observed in a given SLD. Thus, if the SLD "example.com" has two subdomains "one.example.com" and "two.example.com", then its |SLD|=2. For a given $SLD_i$, with rate $R_{SLD_i}$, we calculate its canonical rate $C_{SLD_i}$ as:

$$C_{SLD_i} = R_{SLD_i} + \sum_{j=1}^{|SLD_i|} R_{3LD_j}$$

where:
$R_{SLD_i}$=SLD request rate
$R_{3LD_i}$=3LD request rate
i=the SLD under consideration (i=1, 2, . . . )
j=1, 2, . . .

Once the canonical SLD request rate is determine, in 410 it is determined if the canonical SLD request rate significantly deviates from the mean. When put in canonical form, distinguishing the normal and bot computer traffic is straight forward. The bottom line of FIG. 4B illustrates an average lookup rate for normal (i.e., non-bot) computers, in DNS requests per hour. An expected mean for the rate of normal traffic $E(X)=\mu$. Chebyshev's inequality is then used to fix an appropriate threshold for the normal request rates and request anomalies (i.e., bot) lookups. Chebyshev's inequality equation is:

$$P(|X - \mu| \geq t) \leq \frac{\sigma^2}{t}$$

where:
P=the probability
X=the rate of normal traffic

μ=the mean of the rate of normal traffic
t=the threshold
σ=the standard deviation The inequality places an upper bound on the chance that the difference between X and p will exceed a certain threshold t. As shown on the bottom line of FIG. 4B, normal traffic often uses only one SLD, and the traffic volume is low and relatively stable. In comparison, as shown on the upper line of FIG. 4b, botnets usually use one or more busy subdomains, which tend to have spikes in traffic.

Figure 5A:
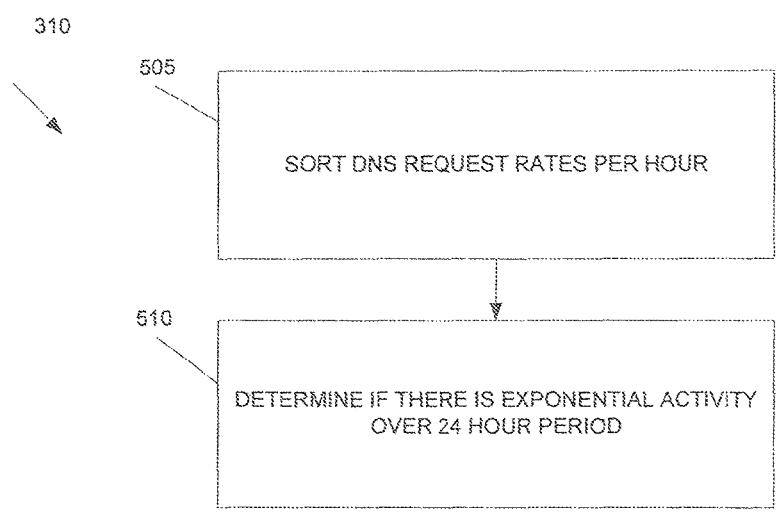

FIG. 5A illustrates the details of how it is determined if a bot's DNS request rate has an exponential request rate, as set forth above in 310. In other words, the DNS density signature is determined. This test can be used as a second detection layer which can be used if the first filter is not effective. For example, the first filter could be evaded by botmasters if they adjust their use of 3LDs or vary their DNS request rates, and thus blend in with normal traffic. In addition, noisy networks make the first filter ineffective because short-term normal and bot DNS rates may be very similar. An administrator may decide to revoke DDNS service for a host that has one or more "spikes" of traffic. To reduce the chance of false positives, a second filter can be used to examine just the hosts who have excessive canonical SLD scores.

A distinguishing feature for this second filter is that botnet DNS request rates are usually exponential over a 24 hour period. The diurnal nature of bot behavior means that there are periodic spikes in bot requests. These spikes are caused by infected hosts who turn on their computers in the morning, releasing a sudden burst of DNS traffic as the bots reconnect to the C&C computer. This spike is not present in normal DNS request rates, which require (usually slower and random) user interaction to generate a DNS request. In some cases, flash crowds of users visiting a popular site may behave like a botnet, but this is rare, and likely not sustained as seen in botnets.

Figure 5B:
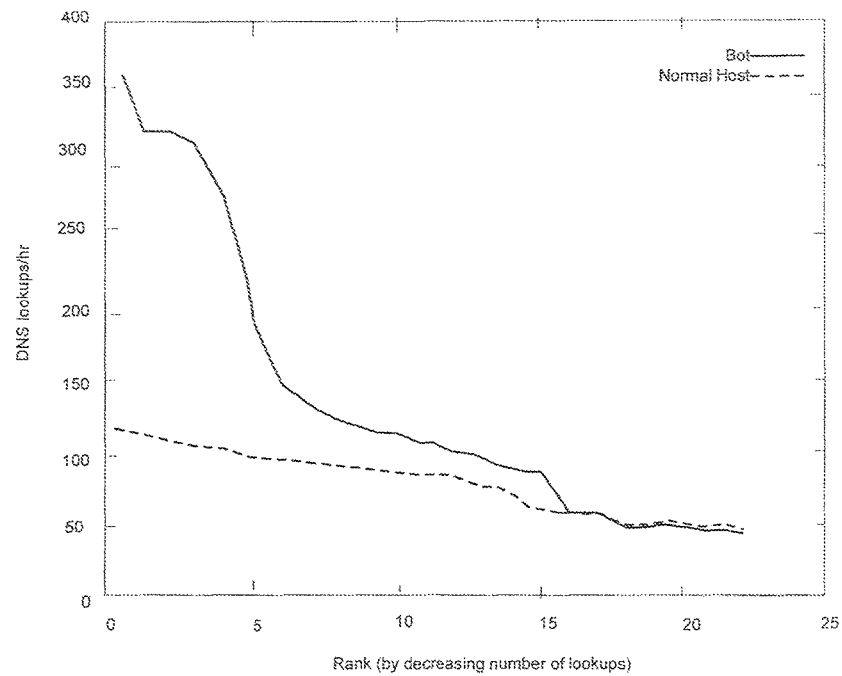

Turning to FIG. 5A, in 505, the DNS request rates are sorted per hour. These sorted rates of normal DNS requests over a 24 hour period create a distribution, or density signature, for normal traffic. FIG. 5B illustrates sorted 24-hour average rates for normal traffic, as compared with sorted botnet traffic. The normal traffic is the bottom line, and the botnet traffic is the top line of FIG. 5B. Because of the diurnal spikes in traffic, the botnet traffic exhibits an exponential distribution.

Turning to 510, it is then determined if the sorted 24-hour traffic has any exponential activity. Any standard distance metric can compare the distributions. For example, the Mahalanbis distance can be used to measure the distance between request rate distributions and a normal model. (Note that other distance metrics can also be used.) The Mahalanobiso distance, d, is:

$$d^2(x,\bar{y}) = (x-\bar{y})'C^{-1}(x-\bar{y})$$

where:
x,ȳ=variable vectors (features) of the new observation and the trained (normal) profile
C=inverse covariance matrix for each member of the training data set The Mahalanobis distance metric considers the variance of request rates in addition to the average request rate. This detects outliers, and measures the consistency of the observed request rates with the trained (normal) samples. The Mahalanobis distance metric can be simplified by assuming the independence of each sample in the normal traffic, and therefore removing the covariance matrix:

$$d(x,\bar{y}) = \sum_{i=0}^{n-1} \frac{|x_i - \bar{y}_i|}{\bar{\sigma}_i}$$

where:
x,ȳ=variable vectors (features) of the new observation and the trained (normal) profile
n=the number of dimensions in the variable vectors
σ=the standard deviation As with the canonical SLD request rate, training can be done using the normal model, and an appropriate threshold can be picked. Training can be done with a model of normal data, and a threshold chosen so that false positives are not generated. If observed traffic for a host has too great a distance score from the normal, it is deemed an outlier, and flagged as a bot computer.

Because of the underlying diurnal pattern driving bot computer name lookups, the sorted request rates only become distinct when grouped into clusters at least several hours in length. For this reason, this secondary detection system can also be used for low-and-slow spreading worms, and as an additional filtration step for noisy networks.

Disrupting Botnets

Figure 6:
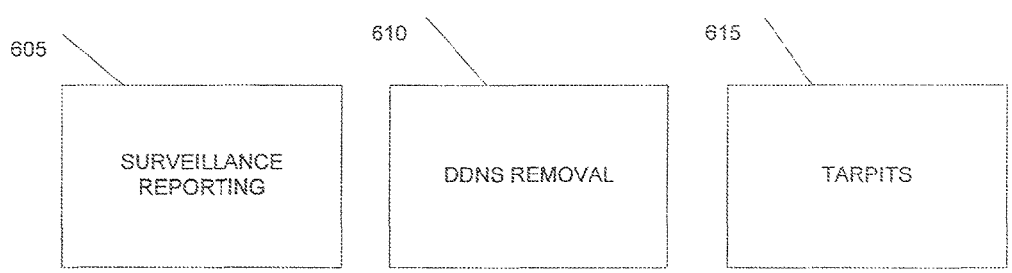

FIG. 6 illustrates several response options once a bot computer is detected, as set forth above in 225 of FIG. 2B: surveillance reporting 605, DDNS removal 610, and tarpits 615. Surveillance reporting 605 merely records the traffic. The sinkhole passively gathers information about attacking networks in a database, and keeps records on victims, activities, OS type/patch levels, and other relevant information. This data is shared with others, including individuals responsible for network response, Border Gateway Protocol (BGP) routing, and other network maintenance. Infection reports can be issued to monitored networks, or can be used to augment other intrusion detection systems, and assist law enforcement investigations. In addition, infection reports can be used to rank the number of infected individuals within Classless Interdomain Routing (CIDR) blocks and Internet Service Providers (ISPs) for a "bot reputation" score, refusing Simple Mail Transfer Protocol (SMTP) sessions from bot computers (to decrease spam), detecting click fraud in online advertising, or other research.

Another response option, DDNS removal 610, is to simply remove the botnets DDNS entry or name registration. Once the traffic is deemed abusive, and measured in the sinkhole, it is possible to revoke the DDNS account. Moreover, it is also possible in some cases to revoke the domain registration used by a botnet. Registration can be revoked where "whois" contact information is missing or proven wrong.

An additional optional response is the use of tarpits 615. There are at least two general types of tarpits: network layer (playing "TCP games") and application layer (honeypots). For network tarpits, in response to incoming bot synchronous (SYN) requests, bots can be sent a reset (RST), blackholed (i.e., given no response), sent a single acknowledgment, given multiple acknowledgments, or handed off to different types of tarpits. Routing layer (LaBrae-style) tarpits, for example, are easily evaded by modern multi-threaded bots. Many bot computers blacklist Internet Protocols (IPs) that repeatedly timeout or behave like a tarpit. Other bot computers use special application layer protocols or port-knocking (i.e., finding ports that are open) to detect tarpits and rival (hijacking) C&C computers.

For this reason, network-level tarpits are not completely effective against all classes of bot computers. For bot computers that have learned how to evade network-layer tarpits, an application-level tarpit is utilized. Many of these bot computers leave the non-application level sinkhole because they expect a particular set of packets from the C&C computer, such as a port-knocking sequence or special banner message from an Internet Relay Chat (IRC) server. A limited proxy can be used to learn the appropriate handshake login sequence the bot expects. The bot computers first join the sinkhole, and are sent to an application-layer tarpit, also called a honeypot. The honeypot sends a "safe" heuristic subset of commands to the C&C computer, and observes the proper response behavior. Unsafe instructions (e.g., commands to scan networks or download other malware) are discarded, since this might expose a bot computer to instructions encoded in the channel topic. Even custom-made, non-RFC compliant protocols, such as heavily modified IRC servers, cannot evade application sinkholing, which slowly learns the proper sequence of instructions to fool the bot computers.

Analyzing Botnets

Modeling Prior Botnets to Predict Future Botnets.

In addition to the responses explained above, experience with previous botnets can also be used to predict the behavior of future botnets. Botnets are very widespread, so it is helpful to comparatively rank them and prioritize responses. Short-term variations in population growth can also be predicted, which is helpful because most dropper programs are short lived. In addition, different botnets use a heterogeneous mix of different infections exploiting different sets of vulnerabilities, often in distinct networks, with variable behavior across time zones. A model that can express differences in susceptible populations, and gauge how this affects propagation speed, is useful.

Figure 7:
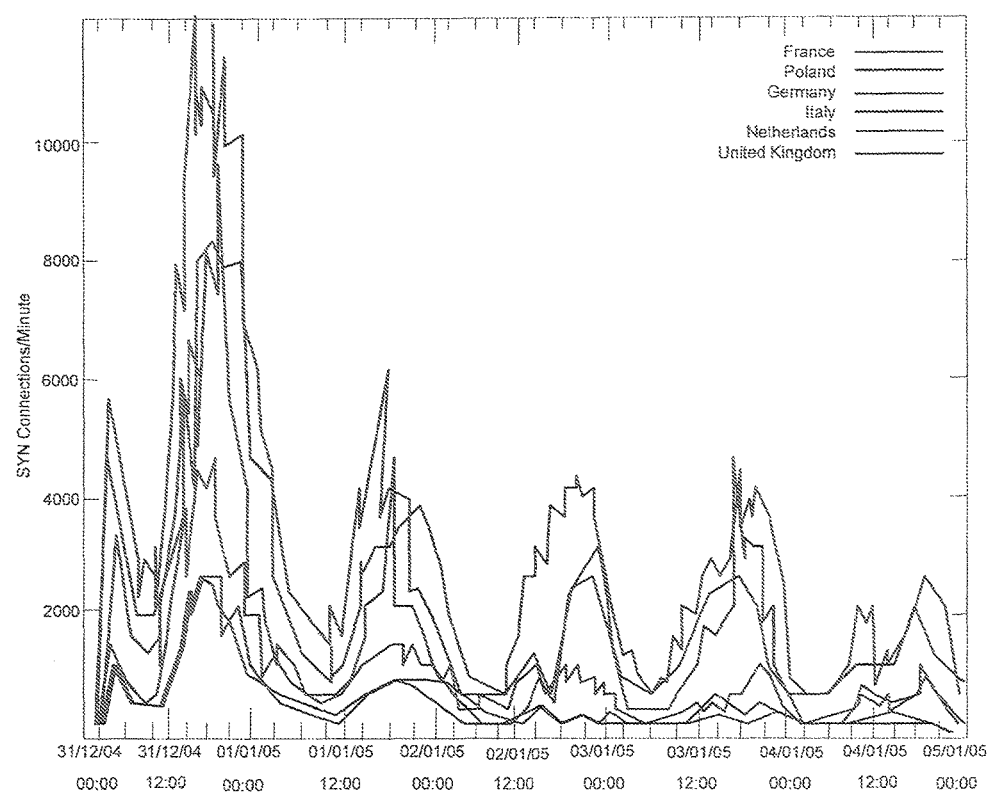

Botnets have a strongly diurnal nature. FIG. 7 illustrates a plot of SYN rates over time, broken down by geographic regions. A SYN rate is the rate of connection requests. The diurnal nature is likely because many users turn their computers off at night, creating a natural quarantine period, and varying the number of victim computers available in a geographical region. Such significant changes in populations over time affects propagation rates. Thus, there are different propagation rates, depending on time zone and time of day. Time zones not only express relative time, but also geography. If there are variable numbers of infected hosts in each region, then the natural quarantine effect created by a rolling diurnal low phase can have a significant impact on malware population and growth. Thus, a model is utilized to express the variable number of infected hosts, time zones, and regions of the Internet. This model allows estimation of short-term population projections for a given work, based on its regional focus, and the time of day. The model illustrates when bot computers spread the fastest, and allow comparison of short-term virulence of two different bot computers. This in turn can be used to improved surveillance and prioritize responses.

As illustrated in FIG. 7, the computers in each time zone are modeled as a group. The computers in each time zone have the same diurnal dynamics, regardless of whether they are infected or still vulnerable. The diurnal property of computers is determined by computer user's behavior, not by the infection status of computers.

As the number of infected computers in a region varies over time, $\alpha(t)$ is defined as the diurnal shaping function, or fraction of computers in a time zone that are still on-line at time t. Therefore, $\alpha(t)$ is a periodical function with a period of 24 hours. Usually, $\alpha(t)$ reaches its peak level at daytime (when users turn on their computers) and its lowest level at night (when users shut off their computers).

Diurnal Model for Single Time Zone.

First, a closed network within a single time zone is considered. Thus, all computers in the network have the same diurnal dynamics. It should be noted that the diurnal property of computers is determined by computer user behavior (e.g., turning on the computer at the beginning of the day). For the formula below, I(t) is defined as the number of infected hosts at time t. S(t) is the number of vulnerable hosts at time t. N(t) is the number of hosts that are originally vulnerable to the worm under consideration. The population N(t) is variable since such a model covers the case where vulnerable computers continuously go online as a worm spreads out. For example, this occurs when a worm propagates over multiple days. To consider the online/offline status of computers, the following definitions are used.

I'(t)=$\alpha$(t)I(t)=number of infected online hosts at time t
S'(t)=$\alpha$(t)S(t)=number of vulnerable hosts at time t
N'(t)=$\alpha$(t)N(t)=number of online hosts among N(t)

To capture the situation where infected hosts are removed (e.g., due to computer crash, patching or disconnecting when infection is discovered), R(t) is defined as the number of removed infected hosts at time t. Thus:

$$\frac{dR(t)}{dt} = \gamma I'(t)$$

where
$\gamma$=removal parameter, since only online infected computers can be removed (e.g., patched)

Thus, the worm propagation dynamics are:

$$\frac{dI(t)}{dt} = \beta I'(t)S'(t) - \frac{dR(t)}{dt}$$

where:

S(t)=N(t)−I(t)−R(t)

$\beta$=pair-wise rate of infection in epidemiology studies. Note that for internet worm modeling $$\beta = \frac{\eta}{\Omega}$$

where:
$\eta$=worm's scanning rate
$\Omega$=size of IP space scanned by the worm Thus, the worm propagation diurnal model is:

$$\frac{dI(t)}{dt} = \beta \alpha^2(t)I(t)[N(t) - I(t) - R(t)] - \gamma\alpha(t)I(t)$$

This diurnal model for a single time zone can be used to model the propagation of regional viruses and/or worms. For example, worms and/or viruses tend to focus on specific geographic regions because of the language used in the e-mail propagation system. Similarly, worms have hard-coded exploits particular to a language specific version of an Operating System (OS) (e.g., a worm that only successfully attacks Windows XP Home Edition Polish). For these regional worms and/or viruses, the infection outside of a single zone is negligible and the infection within the zone can be accurately modeled by the above formula. It should also be noted that it is possible to not consider the diurnal effect. To so do, $\alpha(t)$ is set equal to 1.

Diurnal Model for Multiple Time Zones.

Worms and/or viruses are not limited to a geographic region. Victim bots are usually spread over diverse parts of the world, but can be concentrated in particular regions, depending on how the underlying infections propagate. For example, some attacks target a particular language edition of an operating system, or use a regional language as part of a social engineering ploy. For example, there are worms and/or viruses that contain enormous look-up tables of buffer-overflows offset for each language edition of Windows. Similarly, many email spreading worms and/or viruses use a basic, pigeon English, perhaps to maximize the number of Internet users who will read the message and potentially open up the virus. These regional variations in infected populations play an important role in malware spread dynamics. Thus, in some situations it is useful to model the worm and/or virus propagation in the entire Internet across different time zones. Since computers in one time zone could exhibit different diurnal dynamics from the ones in another time zone, computers in each zone are treated as a group. The Internet can then be modeled as 24 interactive computer groups for 24 time zones. Since many of the time zones have negligible numbers of computers (such as time zones spanning parts of the Pacific Ocean), worm propagation can be considered in K time zones where K is smaller than 24. For a worm and/or virus propagation across different time zones, the worm propagation for time zone i is:

$$\frac{dI_i(t)}{dt} = \sum_{j=1}^{K} \beta_{ji} I'_j(t) S'_i(t) - \frac{dR_i(t)}{dt}$$

which yields:

$$\frac{dI_i(t)}{dt} = \alpha_i(t)[N_i(t) - I_i(t) - R_i(t)] \sum_{j=1}^{K} \beta_{ji} \alpha_j(t) I_j(t) - \gamma_i \alpha_i I_j(t) - \gamma_i \alpha_i(t) I_i(t)$$

where:

$N_i(t)$=the number of online hosts at time t in time zone i (i=1, 2, . . . K)

$S_i(t)$=the number of vulnerable hosts at time t in time zone i $I_i(t)$=the number of infected online hosts at time t in time zone i $R_i(t)$=the number of removed infected hosts at time t in time zone i Similarly, $N_j(t)$, $S_j(t)$, $I_j(t)$, $R_j(t)$=the number of hosts in time zone j=1, 2, . . . K $\alpha_i(t)$=diurnal shaping function for the time zone i $\beta_{ji}$=pairwise rate of infection from time zone j to i $\gamma_i$=removal rate of time zone i For a uniform-scan worm and/or virus, since it evenly spreads out its scanning traffic to the IP space:

$$\beta_{ji} = \frac{\eta}{\Omega}, \forall i, j \in K$$

where:

n=the number of scans sent to the group from an infected host in each time unit;

$\Omega$=the size of the IP space in the group

For worms that do not uniformly scan the IP space:

$$\beta_{ji} = \frac{\eta_{ji}}{\Omega_i}$$

where:

$n_{ji}$=the number of scans sent to group i from an infected host in group j in each time unit;

$\Omega_i$=size of IP space in group i

Thus, when a new worm and/or virus is discovered, the above equation can be used by inferring the parameter $\beta_{ji}$ based on a monitored honeypot behavior of scanning traffic. (Note that a honeypot is a computer set up to attract malicious traffic so that it can analyze the malicious traffic.) As noted above with reference to FIG. 6, many honeypot systems can observe all outgoing scans sent out by a trapped worm and/or virus. The worm's scanning target address distribution can therefore be inferred based on reports from multiple honeypots. Then $\eta_{ji}$ can be derived based on the worm's scanning distribution.

Thus, as illustrated in FIG. 8, equations and graphs can be produced showing the different effect of a virus and/or worm in different time zones. FIG. 8 illustrates the number of SYN connections sent to the sinkhole per minute from each of a North American group, a Europe group, and an Asia group. Note that all the groups shown in FIG. 8 have diurnal (i.e., exponential) behavior at different times of the day. Note that the North American and Asian groups have more noise, likely because countries in these groups tend to span numerous time zones with large numbers of infected individuals, and China has one time zone for the entire country. In comparison, the European countries tend to occupy a single zone, and most victims are located in the western-most time zones.

The diurnal models tell us when releasing a worm will cause the most severe infection to a region or the entire Internet. For worms that focus on particular regions, the model also allows prediction of future propagation, based on time of release. A table of derived shaping functions can be built, which are based on observed botnet data and other heuristics (e.g., the exploit used, the OS/patch level it affects, country of origin). When a new worm and/or virus is discovered, the table for prior deviations can be consulted to forecast the short-term population growth of the bot, relative to its favored zone and time of release.

In addition, knowing the optimal release time for a worm will help improve surveillance and response. To identify an optimal release time, the scenario is studied where the worm uniformly scans the Internet and all diurnal groups have the same number of vulnerable population, i.e., N1=N2=N3. To study whether the worm's infection rate $\beta$ affects the optimal release time, the worm's scan rate $\eta$ $$\left(\text{remember } \beta = \frac{\eta}{\Omega}\right)$$

is changed. The study of optimal release times is useful because we can better determine the defense priority for two viruses or worms released in sequence. Viruses often have generational releases, e.g., worm.A and worm.B, where the malware author improves the virus or adds features in each new release. The diurnal model allows consideration of the significance of code changes that affect S(t) (the susceptible population). For example, if worm.A locally affects Asia, and worm.B then adds a new feature that also affects European users, there clearly is an increase in its overall S(t), and worm.B might become a higher priority. But when worm.B comes out, relative when worm.A started, plays an important role. For example, if the European users are in a diurnal low phase, then the new features in worm.B are not a near-term threat. In such a case, worm.A could still pose the greater threat, since it has already spread for several hours. On the other hand, if worm.B is released at a time when the European countries are in an upward diurnal phase, then worm.B could potentially overtake worm.A with the addition of the new victims.

Figure 9A:
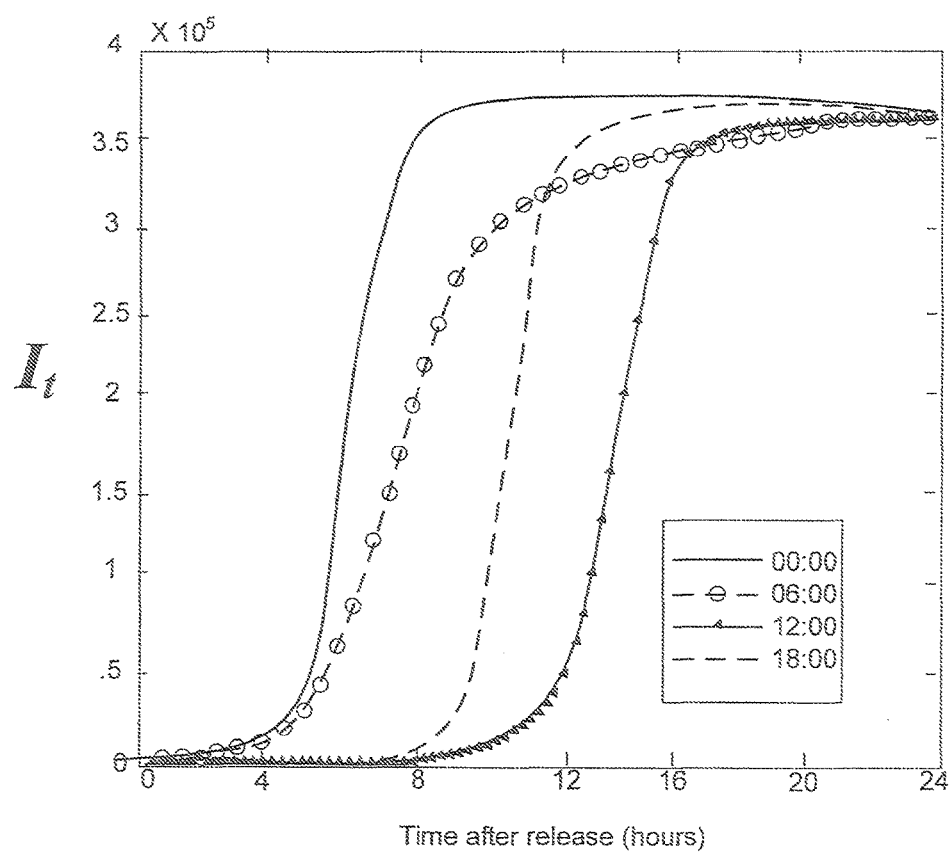
Figure 9B:
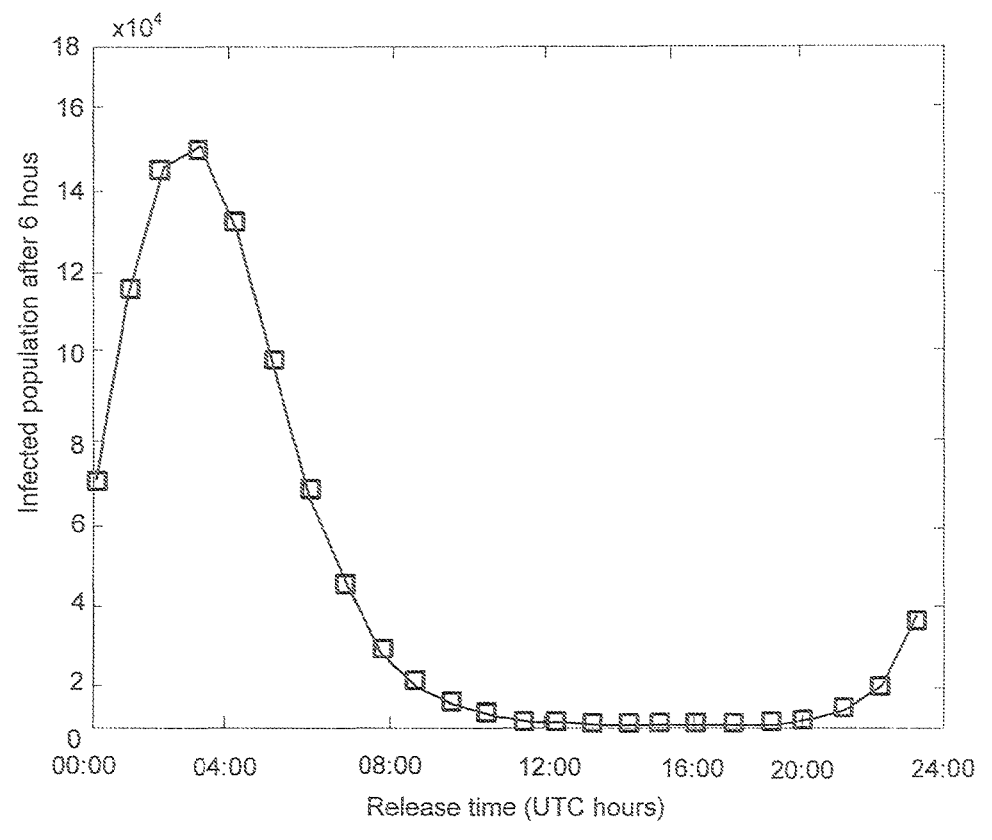

The diurnal models in FIGS. 9A and 9B exposes such a counter-intuitive result. FIG. 9A illustrates worm and/or virus propagation at different release times. In addition, FIG. 9B shows the number of infected hosts at various release times. Thus, as illustrated above, researchers and/or computer managers are able to calculate optimal release items for worms and therefore rank them based on predicted short-term growth rates. Examples of utilizing diurnal models include, but are not limited to: priority ranking (short and long term), patch management, and/or filtration management. In priority ranking, diurnal models help computer managers figure out which botnet needs to be addressed first because they are able to estimate the maximum number of infected individuals from each bot during each time of day. In patch management allows, diurnal models help a computer manager to prioritize patches. For example, if a computer manager knows that a virus related to Microsoft 2000 is impacting a certain number of users at a certain time, he can use this knowledge to prioritize patches performed related to other botnet threats. In filtration management, diurnal models help a computer manager to determine if certain connections should be refused during certain times. For example, if a computer manager knows that during a certain time, email traffic from China will be highly infected, he can use a filter or firewall to refuse that traffic during a certain time period.

DNSBL Monitoring

Another method of passively detecting and identifying botnets (i.e., without disrupting the operation of the botnet) is through revealing botnet membership using Domain Name System-based Blackhole List (DNSBL) counter-intelligence. DNSBL can be used to passively monitor networks, often in real-time, which is useful for early detection and mitigation. Such passive monitoring is discreet because it does not require direct communication with the botnet. A bot that sends spam messages is usually detected by an anti-spam system(s) and reported/recorded in a DNSBL, which is used to track IP addresses that originate spam. An anti-spam system gives a higher spam score to a message if the sending IP address can be looked up on a DNSBL. It is useful to distinguish DNSBL traffic, such as DNSBL queries, that is likely being perpetrated by botmasters from DNSBL queries performed by legitimate mail servers.

Bots sometimes perform look-ups (i.e., reconnaissance to determine whether bots have been blacklisted) on the DNSBL. For example, before a new botnet is put in use for spam, the botmaster of the new botnet or another botnet may look up the members of the new botnet on the DNSBL. If the members are not listed, then the new botnet, or at least certain bots, are considered "fresh" and much more valuable.

If the bot performing reconnaissance is a known bot, e.g., it is already listed on the DNSBL or it is recorded in some other botnet database (e.g., a private botnet database), then the new botnet can be identified using the IPs being queried by the bot. Analysis can be performed at the DNSBL server, and for each query to the DNSBL, the source IP issuing the query can be examined, and the subject IP being queried can also be examined. If the source IP is a known bot, then the subject IP is also considered to be a bot. All of the subject IPs that are queried by the same source IP in a short span of time are considered to be in the same botnet.

Figure 10:
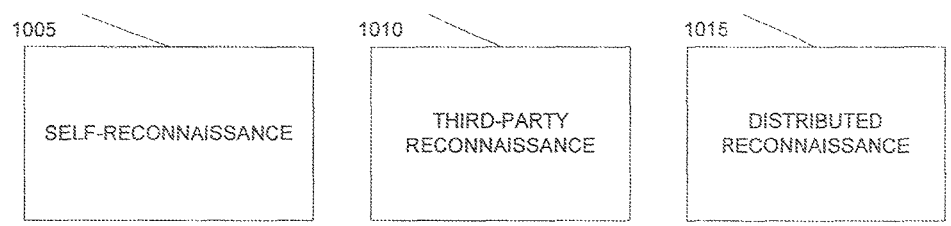

If an unknown bot is performing reconnaissance, it must first be identified as a bot, and then the IPs it queries can also be identified as bots. DNSBL reconnaissance query traffic for botnets is different than legitimate DNSBL reconnaissance query traffic. FIG. 10 illustrates several methods for analyzing reconnaissance traffic, according to several embodiments of the invention.

Self-Reconnaissance

In 1005, self-reconnaissance is detected. To perform "self-reconnaissance", the botmaster distributes the workload of DNSBL look-ups across the botnet itself such that each bot is looking up itself. Detecting such botnet is straightforward because a legitimate mail server will not issue a DNSBL look-up for itself.

Single Host Third-Party Reconnaissance

Figure 11:
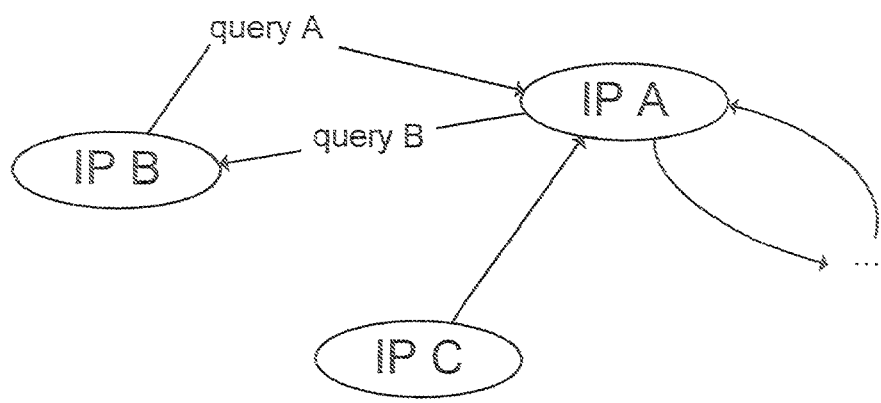

In 1010, single host third-party reconnaissance is detected. To explain third-party reconnaissance, a look-up model is provided in FIG. 11. FIG. 11 illustrates IP address A looking up IP address B, according to one embodiment of the invention. A line from node A to node B indicates that node A has issued a query to a DNSBL to determine whether node B is listed.

A legitimate mail server both receives and sends email messages, and hence, will both perform look-ups (for the email messages it received in) and be the subject of look-ups by other mail servers (for the email messages it sent out). In contrast, hosts performing reconnaissance-based look-ups will only perform queries; they generally will not be queried by other hosts. Legitimate mail servers are likely to be queried by other mail servers that are receiving mail from that server. On the other hand, a host that is not itself being looked up by any other mail server is, in all likelihood, not a mail server but a bot. This observation can be used to identify hosts that are likely performing reconnaissance: lookups from hosts that have a low in-degree (the number of look-ups on the bot itself for the email messages it sent out), but have a high out-degree (the number of look-ups the bot performs on other hosts) are more likely to be unrelated to the delivery of legitimate mail.

In single host third-party reconnaissance, a bot performs reconnaissance DNSBL look-ups for a list of spamming bots. The in-degree ($d_{in}$) should be small because the bot is not a legitimate mail server and it has not yet sent a lot of spam messages (otherwise it will have been a known bot listed in DNSBL already). Thus, a look-up ratio $\alpha_A$ is defined as:

$$\alpha_A = \frac{d_{out}}{d_{in}}$$

where:

$\alpha_A$=the look-up ratio for each node A $d_{in}$=the in-degree for node A (the number of distinct IPs that issue a look-up for A).

$d_{out}$=the out-degree for node A (the number of distinct IPs that A queries)

Thus, utilizing the above formula, a bot can be identified because it will have a much larger value of α than the legitimate mail servers. Single-host reconnaissance can provide useful information. For example, once a single host performing such look-ups has been identified, the operator of the DNSBL can monitor the lookups issued by that host over time to track the identity of hosts that are likely bots. If the identity of this querying host is relatively static (i.e., if its IP address does not change over time, or if it changes slowly enough so that its movements can be tracked in real-time), a DNSBL operator could take active countermeasures.

Distributed Reconnaissance

Referring back to FIG. 10, in 1015, distributed reconnaissance is performed. In distributed reconnaissance, each bot performs reconnaissance on behalf of other bots either in the same botnet or in other botnets. This is done because single host third-party reconnaissance can be easily subject to detection. To remain more stealthy, and to distribute the workload of performing DNSBL reconnaissance, botmasters may distribute lookups across the botnet itself, having bots perform distributed reconnaissance. In this case, the number of look-ups by each bot is small and close to the number of look-ups on the bot itself. Thus, the α value of a bot could be close to that of legitimate servers. Thus, an additional method can be used to detect bots performing distributed reconnaissance.

The temporal arrival pattern of queries at the DNSBL by hosts performing reconnaissance may differ from temporal characteristics of queries performed by legitimate hosts. With legitimate mail server's DNSBL look-ups, the look-ups are typically driven automatically when email arrives at the mail server and will thus arrive at a rate that mirrors the arrival rates of email. Distributed reconnaissance-based look-ups, on the other hand, will not reflect any realistic arrival patterns of legitimate email. In other words, the arrival rate of look-ups from a bot is not likely to be similar to the arrival rate of look-ups from a legitimate email server.

Figure 13:
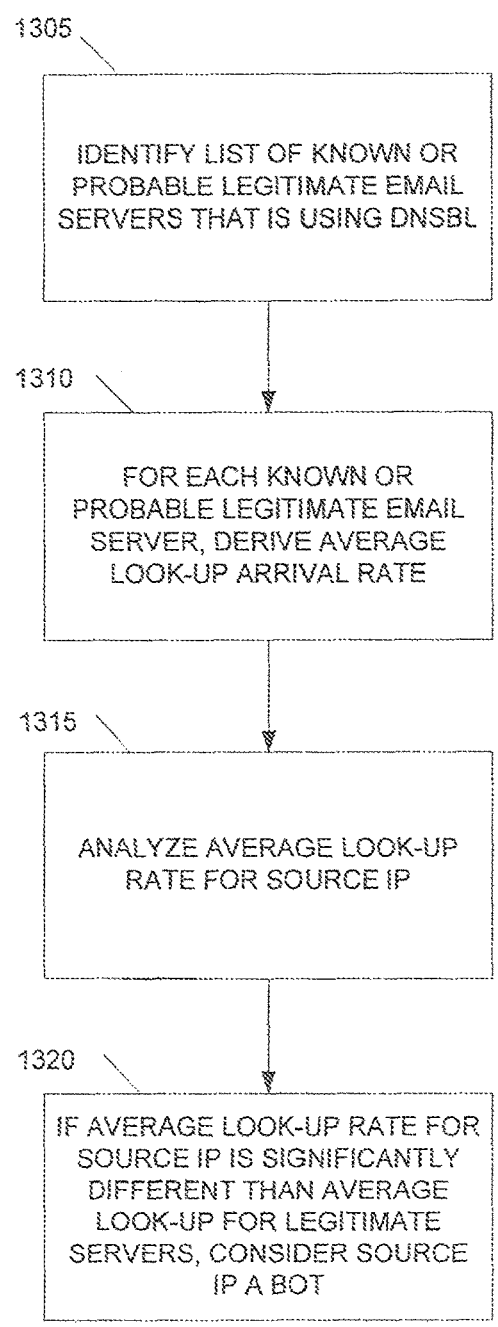

FIG. 13 illustrates the process of determining whether the arrival rate of look-ups from a source IP are similar to the arrival rate of look-ups from legitimate email servers, according to one embodiment of the invention. In 1305, a list of known or probable legitimate email servers that are using the DNSBL service is identified. This can be done, for example, as set forth below:

If the DNSBL is subscription-based or has access control, use a list of approved users (the email servers) to record the IP addresses that the servers use for accessing the DNSBL service. Enter these addresses into a list of Known Mail Server IPs.

If the DNSBL service allows anonymous access, monitor the source IPs of incoming look-up requests, and record a list of unique IP addresses (hereinafter "Probable Known Mail Server IPs"). For each IP address in the Probably Known Mail Server IPs list:

Connect to the IP address to see if the IP address is running on a known mail server. If a banner string is in the return message from the IP address, and its responses to a small set of SMTP commands, e.g. VRFY, HELO, EHLO, etc., match known types and formats of responses associated with a typical known mail server, then the IP address is very likely to be a legitimate email server, and in such a case, enter it into the list of Known Mail Server IPs.

Those of skill in the art will understand that other methods may be used to compile a list of known legitimate email servers. In 1310, for each of the known or probable legitimate email servers, its look-ups to DNSBL are observed, and its average look-up arrival rate $\lambda_i$ for a time interval (say, a 10-minute interval) is derived. This can be done, for example, by using the following simple estimation method. For n intervals (say n is 6), for each interval, the number of look-ups from the mail server, $d_k$ are recorded. The average arrival rate of look-ups from the mail servers over n time intervals is simply:

$$\lambda_i = \frac{\sum_{k=1}^{n} d_k}{n}$$

where:
$\lambda_i$=the average look-up rate for time interval i
$d_k$=the number of lookups from the known mail server
k=the known mail server
n=the number of time intervals In 1315, once the look-up arrival rates from the known mail servers are learned, the average look-up arrival rate $\lambda'$ from a source IP (that is not a known legitimate email server or a known bot) can be analyzed over n time intervals In 1320, if $\lambda'$ is very different from each $\lambda_i$, i.e., $|\lambda'-\lambda_i|>t$ for all i's, where t is a threshold, the source IP is considered a bot. The above process of measuring the arrival rates of the legitimate servers is repeated for every n time intervals. The comparison of the arrival rate from a source IP, $\lambda'$, with the normal values, $\lambda_i$'s, is performed using the $\lambda'$ and $\lambda_i$'s computed over the same period in time.

Figure 15:
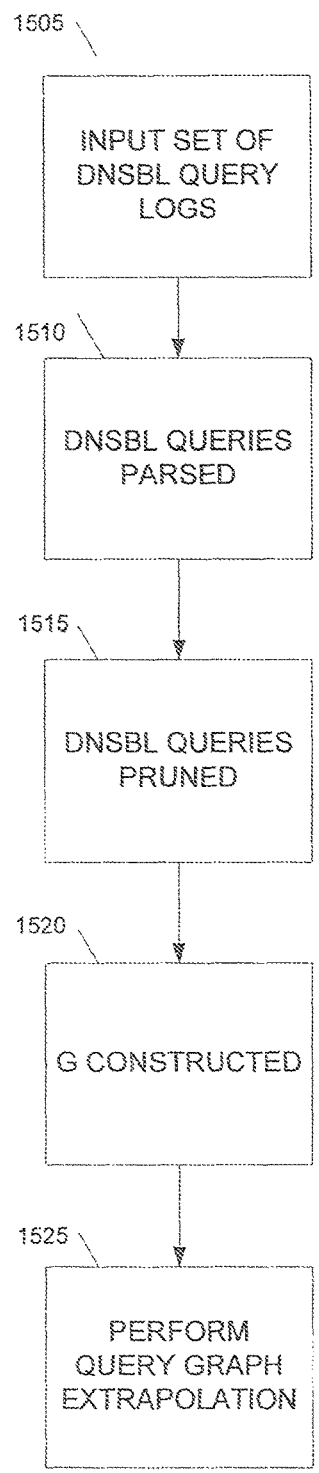

FIG. 15 illustrates a method for constructing a DNSBL query graph, according to one embodiment of the invention. Referring to FIG. 15, in 1505 a set of DNSBL query logs is input. In 1510, the DNSBL queries are parsed to include only querier or queried IP addresses. In 1515, the DNSBL queries are then pruned to include only IP addresses which are present in a set B, which is a set of known bot IP addresses. In 1520, a graph G is a DNSBL query graph constructed using the input from 1505-1515. G illustrates all IP addresses that are querier or queried by the DNSBL pruned queries. Thus, G illustrates all suspect IP addresses that either queried, or were queried by the suspect IP addresses in set B. In 1525, to address the situation where both the querier or queried nodes from the DNSBL query set are members of B, a query graph extrapolation is performed. Here a second pass is made and edges are added if at least one of the endpoints of the edge (i.e., either querier or queried) is already present on the graph G.

FIG. 16 is an algorithm setting forth the method explained in FIG. 15, according to one embodiment of the invention. FIG. 12 sets forth a table of nodes, found utilizing the algorithm in FIG. 16, which has the highest out-degrees, and the number of hosts that are known spammers (appearing in a spam sinkhole).

In addition to finding bots that perform queries for other IP addresses, the above methods also lead to the identification of additional bots. This is because when a bot has been identified as performing queries for other IP addresses, the other machines being queried by the bot also have a reasonable likelihood of being bots.

Figure 14:
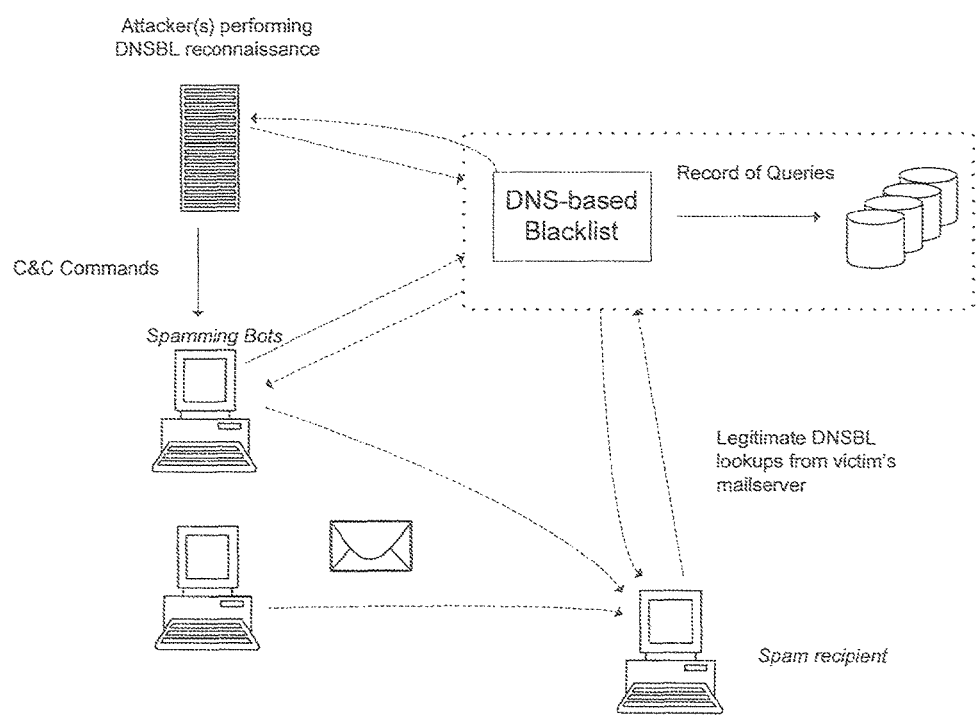

The above methods could be used by a DNSBL operator to take countermeasures (sometimes called reconnaissance poisoning) towards reducing spam by providing inaccurate information for the reconnaissance queries. Examples of countermeasures include a DNSBL communicating to a botmaster that a bot was not listed in the DNSBL when in fact it was, causing the botmaster to send spam from IP addresses that victims would be able to more easily identify and block. As another example, a DNSBL could tell a botmaster that a bot was listed in the blacklist when in fact it was not, potentially causing the botmaster to abandon (or change the use of) a machine that would likely be capable of successfully sending spam. The DNSBL could also be intergrated with a system that performs bot detection heuristics, as shown in FIG. 14. FIG. 14 illustrates spamming bots and a C&C performing reconnaissance, attempting to get DNSBL information. Legitimate DNSBL lookups from a victim's computer are also being requested. A DNSBL responds to the bots, the C&C, and the legitimate computer, but the DNSBL may respond in different ways. For example, the DNSBL may tell the bot computers wrong information in response to their DNSBL requests in order to confuse the botnet, while returning correct information to legitimate servers.

In addition, a known reconnaissance query could be used to boost confidence that the IP address being queried is in fact also a spamming bot. Furthermore, DNSBL lookup traces would be combined with other passively collected network data, such as SMTP connection logs. For example, a DNSBL query executed from a mail server for some IP address that did not recently receive an SMTP connection attempt from that IP address also suggests reconnaissance activity.

DNS Cache Snooping

Figure 17:
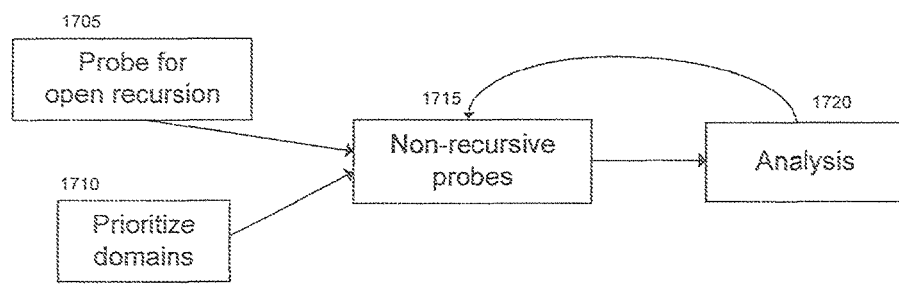
Figure 18:
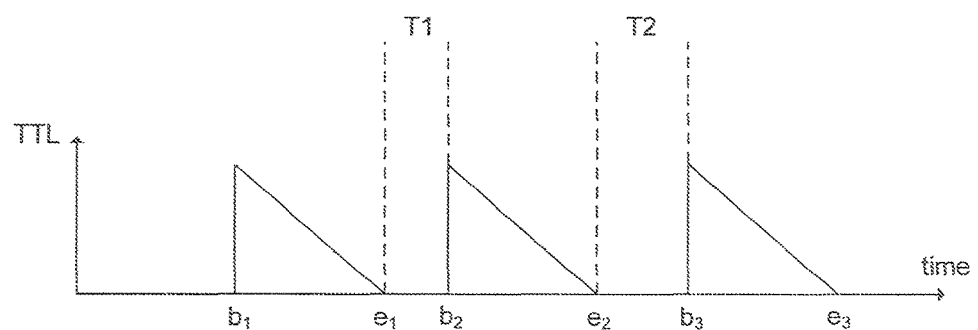

FIGS. 17-18 illustrate a technique to estimate the population of bots within a network through DNS cache inspection or snooping, according to one embodiment of the invention. DNS non-recursive queries (or resolution requests for domains that the DNS server is not authoritative for) are used to check the cache in a large number of DNS servers on the Internet to infer how many bots are present in the network served by each DNS server. DNS non-recursive queries instruct the DNS cache not to use recursion in finding a response to the query. Non-recursive queries indicate in the query that the party being queried should not contact any other parties if the queried party cannot answer the query. Recursive queries indicate that the party being queried can contact other parties if needed to answer the query.

In general, most domain names that are very popular, and thus used extensively, are older, well-known domains, such as google.com. Because of the nature of botnets, however, although they are new, they are also used extensively because bots in the botnet will query the botnet C&C machine name more frequently at the local Domain Name Server (LDNS), and hence, the resource record of the C&C machine name will appear more frequently in the DNS cache. Since non-recursive DNS queries used for DNS cache inspection do not alter the DNS cache (i.e., they do not interfere with the analysis of bot queries to the DNS), they can be used to infer the bot population in a given domain. Thus, when the majority of local DNS servers in the Internet are probed, a good estimate of the bot population in a botnet is found.

DNS cache inspection utilizes a TTL (time-to-live) value (illustrated in FIG. 18) of the resource record of a botnet C&C domain to get an accurate view of how long the resource record stays in the DNS cache. (Note that IP addresses change and/or the DNS server can only remember cache information for a certain amount of time.) When the resource record is saved in the cache, (e.g., as a result of the first DNS look up of the C&C domain from the network), it has a default TTL value, set by the authoritative DNS server. As time goes on, the TTL value decreases accordingly until the resource record is removed from the cache when the TTL value drops to zero. Referring to FIG. 18, three caching episodes are illustrated, each with a beginning point in time b1, b2, and b3, and an end point in time e1, e2, e3. The distance between caching episodes is described as T1, T2, etc. Thus, if we see many caching episodes (or "shark fins") on FIG. 18, we can determine that a large number of hosts are attempting to contact the C&C domain. If the C&C domain is a relatively new and unknown domain, we can then surmise that the domain is used for malicious purposes (e.g., botnet coordination).

Referring to FIG. 17, one embodiment of a DNS cache inspection technique is as follows: In 1705, probes are done for open recursion, and open recursive servers are identified. Open recursive servers are servers that will perform recursive DNS lookups on behalf of queries originating outside of their network. In 1710, priority ranking of domains is performed. (This process is described in more detail later.) The output of 1705 and 1710 (which can be independent phases) is then used in a non-recursive query in 1715. In 1720, analysis is performed, including: (a) determining the relative ranking of botnet sizes, (b) estimating the number of infected individuals/bots within a botnet, and (c) assessing whether and to what extent a given network has infected computers. Since infections are dynamic, ongoing probes are needed. Thus, the analysis from 1720 can also be used to redo 1715 and prioritize the work performed in 1715.

Identifying Open Recursive Servers

Open recursive servers can be identified to, for example: (a) estimate botnet populations, (b) compare the relative sizes of botnets, and (c) determine if networks have botnet infections based on the inspection of open recursive DNS caches.

Open recursive DNS servers are DNS servers that respond to any user's recursive queries. Thus, even individuals outside of the network are permitted to use the open recursive DNS server. The cache of any DNS server stores mappings between domain names and IP addresses for a limited period of time, the TTL period, which is described in more detail above. The presence of a domain name in a DNS server's cache indicates that, within the last TTL period, a user had requested that domain. In most cases, the user using the DNS server is local to the network.

In 1705 of FIG. 17, networks are scanned for all DNS servers, and the networks identify the servers that are open recursive DNS servers. A DNS server (and thus, an open recursive DNS server) can be operated at almost any address within the IPv4 space (i.e., that portion not reserved for special use). We refer to this usable IPv4 address space as a "routable address".

To speed up the search for all DNS servers on the Internet, 1705 breaks up the routable space into organizational units. The intuition is that not all IPv4 addresses have the same probability of running a DNS server. Often, organizations run just a handful of DNS servers, or even just one. The discovery of a DNS server within an organizational unit diminishes (to a non-zero value) the chance that other addresses within the same organization's unit are also DNS servers.

Figure 19:
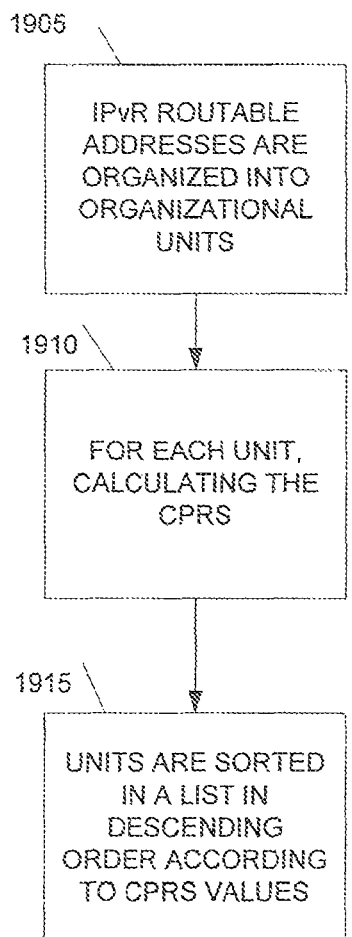

1705 is explained in more detail in FIG. 19, according to one embodiment of the invention. In 1905, the IPv4 routable addresses (using, for example, Request for Comments (RFC) 3330) (note that an RFC is a document in which standards relating to the operation of the Internet are published) is organized into organizational units (using for example, RFC 1446). In 1910, for each organizational unit in 1905, the following calculations are performed to obtain the classless interdomain routing (CIDR) Priority Ranking Score ("CPRS"):

a. For each DNS server known to exist in the organizational unit, add 1.0.

b. For each IP address unit that has previously been seen to not run a DNS server, add 0.01.

c. For each IP address unit for which no information is available, add 0.1.

In 1915, the organizational units are sorted in descending order according to their CPRS values.

Domain Ranking

1710 of the DNS cache inspection process (which can be independent of 1705) produces a set of candidate domains. In other words, this phase generates a list of "suspect" domains that are likely botnet C&C domains. There are multiple technologies for deriving such a suspect list. For example, one can use DDNS or IRC monitoring to identify a list of C&C domains. Those of ordinary skill in the art will see that DDNS monitoring technologies can yield a list of botnet domains.

Cache Inspection

1715 of the DNS cache inspection process combines the outputs of 1705 and 1710. For each domain identified in 1710, a non-recursive query is made to each non-recursive DNS server identified in 1705. Thus, for the top N entries (i.e., the N units with the lowest scores in 1915), the following steps are performed to determine if the DNS server is open recursive:

a. A non-recursive query is sent to the DNS server for a newly registered domain name. This step is repeated with appropriate delays until the server returns an NXDOMAIN answer, meaning that no such domain exists.

b. A recursive query is then immediately sent to the DNS server for the same domain name used in the previous non-recursive query. If the answer returned by the DNS server is the correct resource record for the domain (instead of NXDOMAIN), the DNS server is designated as open recursive.

Determine Number of DNS Servers

Figure 20:
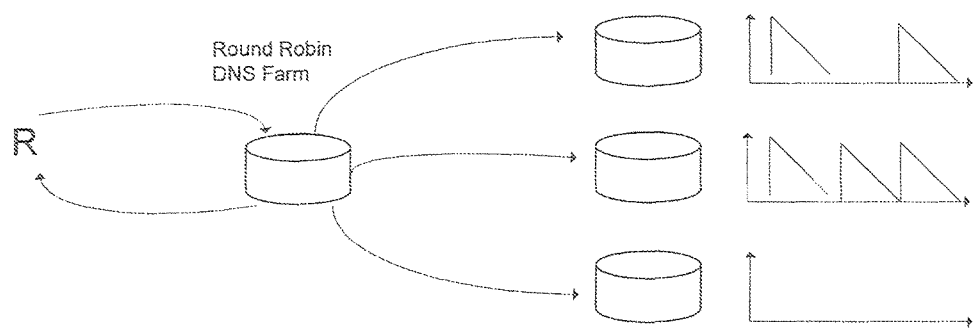

Once an open recursive server is discovered, its cache can be queried to find the server's IP address. Often the server's IP address can be hard to discover because of server load balancing. Load balancing is when DNS servers are clustered into a farm, with a single external IP address. Requests are handed off (often in round-robin style) to an array of recursive DNS machines behind a single server or firewall. This is illustrated in FIG. 20. Each DNS machine maintains its own unique cache, but the DNS farm itself presents a single IP address to outside users. Thus, an inspection of the DNS cache state could come (randomly) from any of the machines behind the single load balancing server or firewall.

This problem is addressed by deducing the number of DNS machines in a DNS farm. Intuitively, multiple non-recursive inspection queries are issued, which discover differences in TTL periods for a given domain. This indirectly indicates the presence of a separate DNS cache, and the presence of more than one DNS server behind a given IP address.

FIG. 21 illustrates a procedure used to deduce the number of DNS servers behind a load balancing server or firewall, according to one embodiment of the present invention. For each open recursive DNS server (ORN), it is determined if the DNS service is behind a load balancing server or firewall and if so the number of servers is estimated as follows: In 2105, the number of Assumed DNS Servers (or "ADS") is set to "1". In 2110, an existing domain is recursively queried for, and the TTL response time is observed. This can be called the TTL response $TTL_0$, and can be placed into a table of Known TTL Values ("KTV"). In 2115, a period of $w_1$, $w_2$, and $w_3$ seconds is waited, where all values of w are less than all KTV entries. In 2120, after $w_1$, $w_2$, $w_3$ seconds, another query is sent to the server. The corresponding TTL response times are observed and called $TTL_1$, $TTL_2$, and $TTL_3$. In 2125, if $w_1+TTL_1$ does not equal any value already in KTV, then $TTL_1$ is entered into the KTV table, and the number of ADS's is incremented by one. This is repeated for $w_2+TTL_2$, and $w_3+TTL_3$. In 2130, it is determined if the ADS count has not been incremented. If not, in 2140, the system is exited. If yes, steps 2120-2130 are repeated until the number of ADS's does not increase.

Some load balancing is performed by a load balancing switch (often in hardware) that uses a hash of the 4-tuple of the source destination ports and IP addresses to determine which DNS server to query. That is, queries will always reach the same DNS server if the queries originate from the same source IP and port. To accommodate this type of load balancing, a variation of the above steps can be performed. 2115 through 2135 can be performed on different machines with distinct source IPs. (This may also be executed on a single multihomed machine that has multiple IP addresses associated with the same machine and that can effectively act as multiple machines.) Thus, instead of starting three threads from a single source IP address, three machines may each start a single thread and each be responsible for querying the DNS server from a distinct source IP. One of the machines is elected to keep track of the ADS count. The distributed machines each wait for a separate wait period, $w_1$, $w_2$, and $w_3$, per step 2115. The distributed machines coordinate by reporting the outcome of the results in steps 2120-2130 to the machine keeping track of the ADS count.

If all DNS queries use only (stateless) UDP packets, the queries may all originate from the same machine, but forge the return address of three distinct machines programmed to listen for the traffic and forward the data to the machine keeping track of the ADS count.

Once the ADS count has been determined for a given DNS server, cache inspection can be performed according to the procedure in FIG. 22. In 2205, each domain identified in 1710 is called a $Domain_S$. For each $Domain_S$, the DNS start of authority (SOA) is consulted for the TTL. This value is called $TTL_{SOA}$. In 2210, for an ORN, x threads are created, where x=ADS*2 (2 times the number of Assumed DNS Servers). The threads are synchronized to perform DNS queries simultaneously according to the following procedure. For $Domain_S$, A master thread waits for half the $TTL_{SOA}$ period, and then instructs the child threads to send their DNS queries. (Since there are twice as many queries as ADS, there is a high probability that each of the DNS servers will receive once of the queries.)

If any of the threads querying an ORN (an open recursive DNS server) reports the ORN not having a cache entry for $Domain_S$, repeat step (a) immediately.

If all of the threads reports that the ORN has a cache entry for $Domain_S$, the smallest returned TTL for all of the threads is called $TTL_{min}$, and all of the threads for $TTL_{min}-1$ seconds sleep before waking to repeat step (a).

In 2215, the above cycle, from 2210(*a*) to 2210(*c*), builds a time series data set of $Domain_S$ with respect to an open recursive DNS server. This cycle repeats until $Domain_S$ is no longer of interest. This occurs when any of the following takes place:

a. $Domain_S$ is removed from the list of domains generated by 1710. That is, $Domain_S$ is no longer of interest.

b. For a period of x $TTL_{SOA}$ consecutive periods, fewer than y recursive DNS servers identified in 1705 have any cache entries for $Domain_S$. That is, the botnet is old, no longer propagating, and has no significant infected population. In practice, the sum of the x TTLSOA period may total several weeks.

In 2220, the cycle from steps 2210(*a*) to 2210(*c*) can also stop when the open recursive DNS server is no longer listed as open recursive by 1705 (i.e., the DNS server can no longer be queried).

Analysis

The analysis phase 1720 takes the cache observations from 1715, and for each domain, performs population estimates. In one embodiment, the estimates are lower and upper bound calculations of the number of infected computers in a botnet. For example, a botnet could be estimated to have between 10,000 and 15,000 infected computers. One assumption made is that the requests from all the bots in a network follow the same Poisson distribution with the same Poisson arrival rate. In a Poisson process, the time interval between two consecutive queries is exponentially distributed. We denote the exponential distribution rate as $\lambda$. Each cache gap time interval, $T_i$, ends with a new DNS query from one bot in the local network, and begins some time after the previous DNS query. Thus, in FIG. 18, the cache interval for the first bot's request occurs between $b_1$ and $e_1$. The time interval $T_1$ measures the distance between the end of the first caching episode $e_1$, and the start of the second $b_2$.

As illustrated in FIG. 18, for a given domain, each name resolution (DNS query) by a bot triggers a caching event with a fresh TTL value that decays linearly over time. The time between any two caching episodes is designated $T_i$. The "memoryless" property of exponential distribution indicates that the cache gap time interval $T_i$ follows the same exponential distribution with the same rate $\lambda$, no matter when the cache gap time interval begins. A function is said to be memoryless when the outcome of any input does not depend on prior inputs. All exponentially distributed random variables are memoryless. In the context of the DNS cache inspection, this means that the length of the current cache interval $T_i$ does not depend on the length of the previous cache interval $T_{i-1}$.

Lower Bound Calculation.

A lower bound can be calculated on the estimated bot population. For the scenario depicted in the figure above, there was at least one query that triggered the cache episode from $b_1$ to $e_1$. While there may have been more queries in each caching episode, each caching event from $b_i$ to $e_i$ represents at least a single query.

If $\lambda_l$ is a lower bound (l) for the arrival rate, and $T_i$ is the delta between two caching episodes, and M is the number of observations, for M+1 cache inspections, $\lambda_l$ can be estimated as:

$$\frac{1}{\hat{\lambda}_l} = \sum_{i=1}^{M} \frac{T_i + TTL}{M} = TTL + \sum_{i=1}^{M} \frac{T_i}{M}$$

Using analysis of a bot (e.g., by tools for bot binary analysis), the DNS query rate $\lambda$ can be obtained for each individual bot. Then from the above formula, the estimate of the bot population $\hat{N}_l$ in the network can be derived as follows:

$$\hat{N}_l = \frac{\hat{\lambda}_l}{\lambda}$$

Upper Bound Calculation.

During a caching period, there are no externally observable effects of bot DNS queries. In a pathological case, numerous queries could arrive just before the end of a caching episode, $e_i$. An upper bound can be calculated on the estimated bot population. Define $\lambda_u$ as the upper bound estimate of the Poisson arrival rate. For the upper bound estimate, there are queries arriving between the times $b_i$ and $e_i$. The time intervals $T_i$, however, represent periods of no arrivals, and can be treated as the sampled Poisson arrival time intervals of the underlying Poisson arrival process. It is fundamental that random, independent sample drawn from a Poisson process is itself a Poisson process, with the same arrival rate. This sampling is called the "Constructed Poisson" process.

For M observations, the estimated upper bound (u) arrival rate $\lambda_u$ is:

$$\frac{1}{\hat{\lambda}_u} = \sum_{i=1}^{M} \frac{T_i}{M}$$

The population of victims needed to generate the upper bound arrival rate $\lambda_u$ can therefore be estimated as:

$$\hat{N}_u = \frac{\hat{\lambda}_u}{\lambda}$$

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

In addition, it should be understood that the figures and algorithms, which highlight the functionality and advantages of the present invention, are presented for example purposes only. The architecture of the present invention is sufficiently flexible and configurable, such that it may be utilized in ways other than that shown in the accompanying figures and algorithms.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A method of detecting and remediating a network of compromised computers, comprising:
    collecting, using a hardware processor, Domain Name System (DNS) data for a domain;
    examining, using the hardware processor, the collected data to determine whether third level domain requests exceed second level domain requests for the domain; and
    responsive to determining that the third level domain requests exceed the second level domain requests for the domain, determining that the domain is associated with a command and control computer for a botnet.

2. The method of claim 1, wherein the DNS data comprises DNS queries.

3. The method of claim 1, further comprising: observing time zone and time of release information for the collected data.

4. The method of claim 1, wherein determining that the domain is associated with a command and control computer comprises determining a canonical SLD request rate; and
    determining if the determined canonical SLD request rate against deviates from a known mean.

5. The method of claim 1, further comprising, identifying, using the hardware processor, the internet protocol (IP) address of the command and control computer; and
    assigning, using the hardware processor, a sinkhole device to the IP address of the command and control computer.

6. The method of claim 5, wherein the sinkhole device captures network traffic from one or more infected bot computers.

7. The method of claim 6, further comprising analyzing, using the hardware processor, the network traffic from the one or more infected bot computers.

8. The method of claim 7, wherein the network traffic comprises at least one of information about attaching networks, victim information, operating system type, software installed, and patch level of installed software.

9. The method of claim 7, further comprising sharing, using the hardware processor, the analyzed network traffic from the one or more infected bot computers with a third party system.

10. The method of claim 7, further comprising requesting, using the hardware processor, that the domain associated with the command and control computer be revoked.

11. The method of claim 6, further comprising:
    determining, based on the analyzed network traffic, an amount of synchronous requests from the one or more infected bots computers; and
    generating, based the amount of synchronous requests, a diurnal model for at least one time zone.

12. The method of claim 11, wherein the diurnal model for at least one time zone comprises a diurnal model for a plurality of time zones, and further comprising: ranking the diurnal models for a plurality of time zones based on at least one of priority and patch management.

13. The method of claim 12, further comprising predicting, based on the ranking of the diurnal models, a short term growth of the botnet.

14. The method of claim 6, further comprising responding, using a tarpit device, to at least one of the one or more infected bot computers synchronous requests with at least one of a reset command, a blackholed response, a single acknowledgement, a plurality of acknowledgements, and a command to connect to another tarpit.

15. The method of claim 14, wherein the tarpit device is at least one of a network player tarpit, routing layer, and an application layer tarpit.

16. The method of claim 1, wherein examining the collected data further comprises: analyzing one or more non-recursive DNS queries stored in a DNS cache.

17. The method of claim 16, wherein the non-recursive DNS queries have a time-to-live value.

18. An information handling device for detecting and remediating a network of compromised computers, comprising:
    at least one hardware processor; and
    a computer readable storage device having computer readable program code embodied therewith and executable by the at least one hardware processor, the computer readable program code comprising:
    computer readable program code that collects Domain Name System (DNS) data for a domain;
    computer readable program code that examines the collected data to determine whether third level domain requests exceed second level domain requests for the domain; and
    responsive to determining that the third level domain requests exceed the second level domain requests for the domain, computer readable program code that determines that the domain is associated with a command and control computer for a botnet.

19. A method of detecting and remediating a network of compromised computers, comprising:
    collecting, using a hardware processor, Domain Name System (DNS) data for a domain;
    examining, using the hardware processor, the collected data to determine whether third level domain exceed of second level domain requests for the domain; and
    determining, based on the examining, that the domain is associated with a command and control computer for a botnet, wherein determining that the domain is associated with a command and control computer comprises determining a canonical SLD request rate.

* * * * *